US010911828B2

(12) United States Patent
Kurzynski et al.

(10) Patent No.: US 10,911,828 B2
(45) Date of Patent: Feb. 2, 2021

(54) METHODS AND APPARATUS TO IMPUTE MEDIA CONSUMPTION BEHAVIOR

(71) Applicant: The Nielsen Company (US), LLC, New York, NY (US)

(72) Inventors: David J. Kurzynski, South Elgin, IL (US); Balachander Shankar, Tampa, FL (US); Richard Peters, Gurnee, IL (US); Jonathan Sullivan, Hurricane, UT (US); Molly Poppie, Arlington Heights, IL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 16/773,725

(22) Filed: Jan. 27, 2020

(65) Prior Publication Data

US 2020/0162791 A1 May 21, 2020

Related U.S. Application Data

(63) Continuation of application No. 15/361,314, filed on Nov. 25, 2016, now Pat. No. 10,547,906.

(30) Foreign Application Priority Data

Jun. 7, 2016 (IN) .............................. 201611019573

(51) Int. Cl.
*G06N 20/00* (2019.01)
*H04N 21/84* (2011.01)
(Continued)

(52) U.S. Cl.
CPC ......... *H04N 21/4667* (2013.01); *G06N 7/005* (2013.01); *G06N 20/00* (2019.01);
(Continued)

(58) Field of Classification Search
CPC ............ H04N 21/278; H04N 21/4667; H04N 21/44222; H04N 21/4532; H04N 21/84; G06N 20/00; G06N 7/005; G06Q 30/0255
(Continued)

(56) References Cited

U.S. PATENT DOCUMENTS 4,566,030 A 1/1986 Nickerson et al.
8,266,644 B2 9/2012 Randolph et al.
(Continued)

OTHER PUBLICATIONS

Jerome P. Reiter, "Simultaneous Use of Multiple Imputation for Missing Data and Disclosure Limitation", vol. 30, 2004 (20 pages).
(Continued)

*Primary Examiner* — Nathan J Flynn
*Assistant Examiner* — Caroline Somera
(74) *Attorney, Agent, or Firm* — Hanley, Flight & Zimmerman, LLC

(57) ABSTRACT

Methods, apparatus, systems and articles of manufacture to impute media consumption behavior are disclosed. An example apparatus includes a localized event engine implemented with hardware or at least one processor to, in response to a difference satisfying a first threshold, determine that a first subset of tuning data exhibits local bias, the difference to be between (i) a first percentage of exposure minutes determined from the tuning data, and (ii) a second percentage of exposure minutes determined from viewing data, determine that a second subset of the viewing data represents heavy viewing in response to (1) a first number of households satisfying a second threshold and (2) a third percentage of exposure minutes satisfying a third threshold, and a localized event selector implemented with hardware or the at least one processor to impute the second subset of the viewing data for the first subset of the tuning data.

21 Claims, 12 Drawing Sheets

(51) Int. Cl.
  *H04N 21/466* (2011.01)
  *G06N 7/00* (2006.01)
  *H04N 21/442* (2011.01)
  *H04N 21/45* (2011.01)
  *G06Q 30/02* (2012.01)

(52) U.S. Cl.
  CPC ... *G06Q 30/0255* (2013.01); *H04N 21/44222* (2013.01); *H04N 21/4532* (2013.01); *H04N 21/84* (2013.01)

(58) Field of Classification Search
  USPC .......................................................... 725/14
  See application file for complete search history.

(56) References Cited

U.S. PATENT DOCUMENTS

| | | | |
|---|---|---|---|
| 8,701,135 | B2 | 4/2014 | Yazdani et al. |
| 8,739,198 | B2 | 5/2014 | Falcon |
| 9,363,558 | B2 | 6/2016 | Meraviglia |
| 9,420,320 | B2 | 8/2016 | Doe |
| 9,473,814 | B1 | 10/2016 | Schlack et al. |
| 9,900,654 | B2 | 2/2018 | Meraviglia |
| 10,264,318 | B2 | 4/2019 | Kurzynski et al. |
| 10,547,906 | B2 | 1/2020 | Kurzynski et al. |
| 2008/0300965 | A1 | 12/2008 | Doe |
| 2009/0265215 | A1 | 10/2009 | Lindstrom |
| 2010/0115543 | A1 | 5/2010 | Falcon |
| 2012/0254911 | A1 | 10/2012 | Doe |
| 2014/0150003 | A1 | 5/2014 | Doe |
| 2014/0379421 | A1 | 12/2014 | Shankar et al. |
| 2015/0039389 | A1 | 2/2015 | Besehanic et al. |
| 2015/0067075 | A1 | 3/2015 | Sheppard et al. |
| 2015/0229979 | A1 | 8/2015 | Wood et al. |
| 2015/0262207 | A1 | 9/2015 | Rao et al. |
| 2015/0348095 | A1 | 12/2015 | Dixon et al. |
| 2016/0119672 | A1 | 4/2016 | Alonso et al. |
| 2016/0269766 | A1 | 9/2016 | Levande et al. |
| 2016/0269783 | A1 | 9/2016 | Mowrer et al. |
| 2016/0323616 | A1 | 11/2016 | Doe |
| 2017/0006342 | A1 | 1/2017 | Nagaraja Rao et al. |
| 2017/0061470 | A1 | 3/2017 | Sheppard et al. |
| 2017/0064358 | A1 | 3/2017 | Sullivan et al. |
| 2017/0353766 | A1 | 12/2017 | Kurzynski et al. |

OTHER PUBLICATIONS

Pete Doe, "Bringing Set Top Box Data to Life", ARF Audience Measurement Symposium 2.0, Jun. 26, 2007 (9 pages).

United States Patent and Trademark Office, "Non-Final Office Action", issued in connection with U.S. Appl. No. 15/361,315, dated Oct. 11, 2017 (17 pages).

United States Patent and Trademark Office, "Non-Final Office Action," issued in connection with U.S. Appl. No. 15/361,315, dated Apr. 16, 2018, 6 pages.

United States Patent and Trademark Office, "Corrected Notice of Allowance," issued in connection with U.S. Appl. No. 15/361,315, dated Jan. 3, 2019, 2 pages.

United States Patent and Trademark Office, "Notice of Allowance," issued in connection with U.S. Appl. No. 15/361,315, dated Nov. 27, 2018, 5 pages.

United States Patent and Trademark Office, "Non-Final Office Action," issued in connection with U.S. Appl. No. 15/361,314, dated Oct. 5, 2018, 11 pages.

United States Patent and Trademark Office, "Non-Final Office Action," issued in connection with U.S. Appl. No. 15/361,314, dated Nov. 29, 2017, 14 pages.

United States Patent and Trademark Office, "Final Office Action," issued in connection with U.S. Appl. No. 15/361,314, dated Jun. 21, 2018, 8 pp.

United States Patent and Trademark Office, "Notice of Allowance," issued in connection with U.S. Appl. No. 15/361,314, dated Dec. 12, 2019, 7 pages.

United States Patent and Trademark Office, "Notice of Allowance," issued in connection with U.S. Appl. No. 15/361,314, dated Sep. 13, 2019, 9 pages.

United States Patent and Trademark Office, "Notice of Allowance," issued in connection with U.S. Appl. No. 15/361,314, dated May 13, 2019, 9 pages.

METHODS AND APPARATUS TO IMPUTE MEDIA CONSUMPTION BEHAVIOR

RELATED APPLICATIONS

This patent arises from a continuation of U.S. patent application Ser. No. 15/361,314, filed Nov. 25, 2016, now U.S. Pat. No. 10,547,906, which claims the benefit of, and priority from, Indian Patent Application No. 201611019573, entitled "Viewer Assignment Enhancements," which was filed on Jun. 7, 2016. U.S. patent application Ser. No. 15/361,314 and Indian Patent Application No. 201611019573 are hereby incorporated herein by reference in their entireties.

FIELD OF THE DISCLOSURE

This disclosure relates generally to audience measurement and, more particularly, to methods and apparatus to improve viewer assignment by adjusting for a localized event.

BACKGROUND

In recent years, panelist research efforts included associating accessed media content with household members that fit one or more demographics of interest using installed metering hardware. In some cases, the metering hardware is capable of determining whether a media presentation device (such as a television set) is powered on and tuned to a specified station via a hardwired connection from the media presentation device to the meter. In other cases, the metering hardware is capable of determining which household member is exposed to a specified portion of media via one or more button presses on a People Meter by the household member near the television. Collected information from the different types of meters provides insight to the various factors influencing media consumption behavior habits of viewers.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
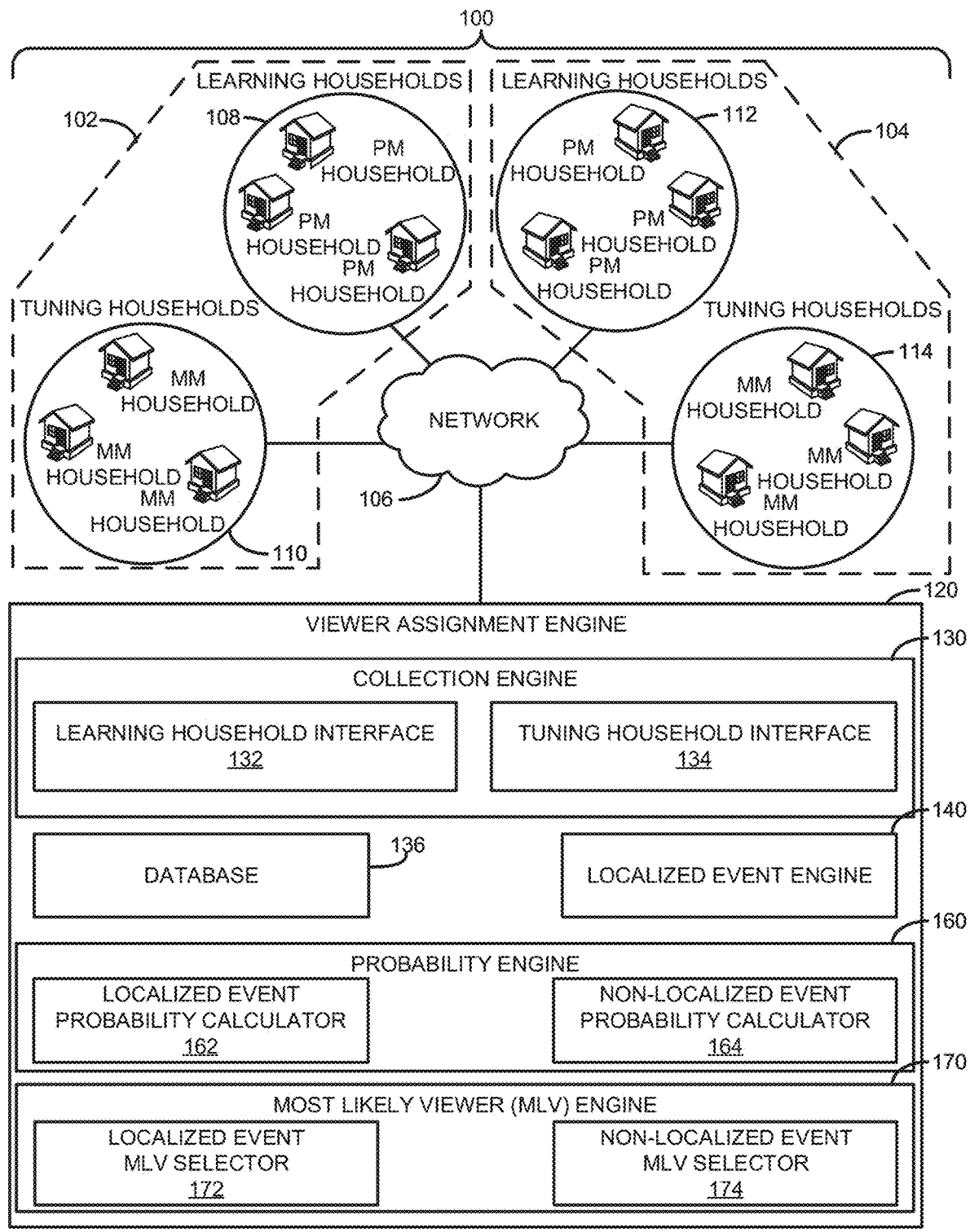
FIG. 1 illustrates an example media distribution environment implemented in accordance with the teachings of this disclosure to improve viewer assignment by adjusting for a localized event.

Audience measurement entities seek to understand the audience composition and/or size of media, such as radio programming, television programming, Internet media, etc., so that advertising prices may be established that are commensurate with audience exposure and/or demographic makeup (referred to herein collectively as "audience configuration"). As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

Media providers employ a wide variety of media platforms to present media to audiences. Media providers may include media broadcasting providers (e.g., ABC®, CBS®, NBC®, etc.), streaming media providers (e.g., Hulu®, Netflix®), etc. Media platforms may include media delivery methods such as, for example, coaxial cable, digital subscriber line (DSL), fiber cable, satellite delivered cable television programming, wired and/or wireless streaming to the above-described media devices, etc. Media providers may present media via separate media channels and/or media stations. A media channel and/or a media station may include a channel on set-top box television programming (e.g., Channel 1, 2, etc.), a channel on streaming services and/or websites (e.g., a Hulu® channel, a YouTube® channel, etc.), an application (e.g., a stand-alone application and/or browser) on a mobile operating system (e.g., Android® operating system, Apple iOS® operating system, etc.) etc. For example, a media provider (e.g., ESPN®) may deliver a sporting event to a customer via a set-top box "ESPN" media station (e.g., a set-top box media station 37 corresponding to the ESPN® media station), via the "WatchESPN" application on a mobile device, via a website www.ESPN.com, etc. As used herein, the terms "media channel" and "media station" are used interchangeably.

To determine aspects of audience configuration (e.g., which household member is currently watching a specified portion of media, the corresponding demographics of that household member, etc.), audience measurement entities may perform audience measurement by enlisting a number of consumers as panelists. As used herein, panelists are users (e.g., audience members) registered on panels maintained by a ratings entity (e.g., an audience measurement company). An audience measurement entity typically monitors media consumption behaviors (e.g., tuning, viewing, etc.) of the enlisted audience members via audience measurement system(s), such as a metering device, a people meter, etc. Audience measurement typically involves identifying media being displayed on a media presentation device, such as a television.

As described above, audience measurement entities may employ audience measurement systems including a device, such as the people meter (PM), having a set of inputs (e.g., one or more user input buttons) that are each assigned to a corresponding member of a household. The PM device captures information about the household audience by prompting the audience member(s) to indicate that they are present in the media exposure area (e.g., a living room in which a television set is present, etc.) during media presentation by, for example, pressing their assigned input key on the PM device. When a member of the household selects their corresponding input, the PM device identifies which household member is present, and associates demographic information associated with the household member, such as a name, a gender, an age, an income category, etc. with the media presentation.

Data collected by the PM device may be stored in a memory and transmitted via one or more networks, such as the Internet, to a data store managed by an audience measurement entity such as The Nielsen Company (US), LLC. Typically, such data is aggregated by the audience measurement entity with data collected from a large number of PM devices monitoring a large number of panelist households. Such collected and/or aggregated data may be further processed to determine statistics associated with household behavior in one or more designated market areas (DMA) of interest. An example DMA of interest may be a city, a state, a time zone, a country, or another measure of geographical or numerical size as it pertains to monitoring media activity.

Another example of how audience measurement entities may employ audience measurement systems to collect household panelist behavior data is through the utilization of a media meter (MM) device. Example MM devices disclosed herein are distinguished from PM devices that include a physical input to be selected by a panelist household member actively consuming the media. In examples disclosed herein, MM devices capture audio with or without a physical connection to the media presentation device. In some examples, MM device do not include one or more inputs for selection by one or more household panelists to identify which panelist is currently viewing the media device. Rather than collecting audience composition data directly from panelists, example methods, apparatus, systems and/or articles of manufacture disclosed herein impute which household members are viewers of media programming in households with the MM device. For example, disclosed examples facilitate a manner of determining which panelist household members are viewing media in a manner that avoids the expense of additional PM device installation in panelist households.

Audience measurement (AM) systems, as described above, use various types of metering devices for associating and/or crediting media viewing to a demographic identifying a panelist that viewed the media. An example AM system can utilize PM devices, MM devices, and/or alternative metering devices. An example AM system that includes PM devices and MM devices matches panelist media consumption behavior obtained from PM devices to panelist media consumption behavior obtained from MM devices using a model derived from a variety of example mathematical, probabilistic, and/or statistical techniques.

In examples disclosed herein, example panelist data is analyzed for household behavior statistics such as, for example, a number of minutes a household media device tuned to a specified media station (e.g., tuning minutes), a number of minutes a household media device used (e.g., viewing minutes) by a household panelist member (e.g., a uniquely identified viewing panelist) and/or one or more visitors, demographics of an audience, which may be statistically projected based on the panelist data, etc. Additional example household behavior statistics may include a number of minutes an example media presentation device (e.g., a household media playback device) presented media, wherein the example media presentation device may be operative in a household that may contain a PM device and/or an MM device. As used herein, the term media presentation device may refer to a household media device that is presenting media and/or exposing panelists to media in a media exposure environment in which the household media device may be tuned to a media station and/or may be viewed by a panelist. For example, the terms "media presentation device minutes" and "exposure minutes" include tuning minutes and/or viewing minutes.

Example households that include a PM device (e.g., learning households) collect media consumption behavior, referred to herein as "donor data." As used herein, "donor data" refers to information that includes both (1) media identification data (e.g., code(s) embedded in or otherwise transmitted with media, signatures, channel tuning data, etc.) and (2) person identifying information corresponding to the household member(s) and/or visitor(s) that are watching, viewing, listening to and/or otherwise accessing the identified media. Example households that include an MM device (e.g., tuning households) collect media identification data, referred to herein as "recipient data." As used herein, "recipient data" refers to information that includes media identification data (e.g., codes, signatures, etc.), but does not include person identifying information. The terms "donor data" and "recipient data" may collectively be referred to herein as "exposure data." Example learning households and example tuning households include panelists, which are demographically identified members of their respective households. As described above, at least one distinguishing factor between donor data and recipient data is that donor data also includes information that identifies which specified household member is responsible for consuming media (e.g., person identifying information).

In some examples, example AM systems may use the media consumption behavior obtained from PM devices located in learning households to calculate viewing probabilities for viewing panelists. For example, donor data collected from PM devices may be used to determine probabilities that the viewing panelists of a specified demographic within the learning households viewed the media on media presentation devices associated with the viewing panelists. Example AM systems may collect and/or organize donor data from PM devices in time periods and/or time intervals such as a quarter-hour (fifteen (15) minute) time period.

Example AM systems may additionally and/or alternatively use media consumption behavior obtained from MM devices located in tuning households to calculate tuning probabilities for tuning panelists. For example, disclosed examples may use recipient data collected from MM devices to determine probabilities that the tuning panelists of a specified demographic within the tuning households tuned to the media on media presentation devices associated with the tuning panelists. In some examples, AM systems collect and/or organize recipient data from MM devices in time periods such as a quarter-hour (fifteen (15) minute) time period.

In some examples, AM systems may use viewing probabilities and tuning probabilities in a matching process to match viewing panelists with tuning panelists that exhibit similar media consumption behavior. For example, example matching processes may use viewing probabilities calculated for a plurality of viewing panelists of a specified demographic or a plurality of specified demographics within a plurality of learning households. The example matching processes may also use tuning probabilities calculated for a plurality of tuning panelists of the same specified demographic within two or more tuning households. For example, example AM systems may match media consumption behavior associated with a tuning panelist in a tuning household with media consumption behavior associated with a viewing panelist in a learning household. Example AM systems may then impute the tuning panelist tuning minutes as the viewing panelist viewing minutes. For example, example AM systems may identify the tuning panelist by imputing (e.g., associating) the demographics of the tuning panelist as the demographics of the viewing panelist. Identifying the tuning panelist in this example manner may allow the identification of tuning panelists without the added expense of distributing additional PM devices and inconveniencing panelists by eliciting active acknowledgments of their consumption of media as in learning households.

In some disclosed examples, AM systems may narrow the number of households of interest to process by identifying qualified households. As used herein, a qualified household is a household that satisfies one or more specified demographics and/or filtering parameters of interest for a DMA being processed by an audience measurement entity. A collection of qualified households designated for processing may represent an example household pool (e.g., a learning household pool, a tuning household pool, etc.) that contains example panelists (e.g., viewing panelists, tuning panelists, etc.). A learning household pool may include, for example, a number of panelists in learning households within a DMA (or DMAs) of interest. Similarly, a tuning household pool may include, for example, a number of panelists in tuning households within a DMA (or DMAs) of interest. Example qualified households may be equipped with one or more metering devices such as PM devices and/or MM devices. However, an example household pool may or may not include qualified households. Moreover, during an example matching process, in some instances, there may not be enough qualified learning households to match to the number of qualified tuning households. In some such instances, example AM systems may determine to expand the learning panelist pool (e.g., analyze additional DMA) to identify enough qualified learning households to match with qualified tuning households.

In some disclosed examples, expanding the learning panelist pool by collecting panelist data from one or more additional DMA(s) may produce imputation errors due to a localized event within a DMA. The localized event may be an event occurring in the DMA and/or of greater importance to panelists in the DMA as opposed to other DMAs. In some examples, the localized event may be presented as media on a media station that may be viewed by panelists in the DMA, while in other DMAs, the same media station may be presenting different media than the media in the DMA. The audience configuration of the panelists exposed to the localized event may be significantly different than the audience configuration of the same media station in a different DMA. For example, the localized event may attract a significantly greater number of panelists to the media station presenting the localized event than the number of panelists the same media station attracts in another DMA with different media.

An example of such a localized event may include a broadcast of a professional football game featuring the Philadelphia Eagles within a first example DMA (e.g., Philadelphia). A number of tuning panelists within the first example DMA (e.g., Philadelphia) may be accessing first example media (e.g., the professional football game) on a first example media station (e.g., ABC Philadelphia) during a time period. In addition, a number of viewing panelists within a second example DMA (e.g., New York City) may be accessing second example media (e.g., "Dancing with the Stars") on a second example media station (e.g., ABC National TV media station) during the same time period. In some such examples, the media consumption behavior and/or audience configuration of tuning panelists in the first example DMA (e.g., Philadelphia) may differ from the media consumption behavior and/or audience configuration of viewing panelists in the second example DMA (e.g., New York City).

In the illustrated examples, the panelists in a DMA where the localized event is occurring may exhibit a biased media consumption behavior in favor of the localized event. As used herein, biased media consumption behavior in favor of the localized event is referred to as "local bias media consumption behavior" or a "local bias." As used herein, the term "local bias media consumption behavior" is used interchangeably with the term "localized event media consumption behavior."

In some disclosed examples, imputation errors (e.g., a local bias) may occur due to a localized event, for example, when attempting to match tuning panelists in tuning households in the first example DMA (e.g., Philadelphia) to viewing panelists in learning households in the second example DMA (e.g., New York City). A discrepancy between the first audience configuration and the second audience configuration may produce an imbalance of available panelists during an example matching process of tuning panelists in tuning households and viewing panelists in learning households, which may lead to example imputation errors.

As disclosed above, an example imbalance (e.g., an age imbalance, a gender imbalance, etc.) between tuning panelists in tuning households and viewing panelists in learning households may produce imputation errors between a first audience configuration associated with panelists who accessed the first media (e.g., the professional football game) via the first media station (e.g., ABC Philadelphia) within the first DMA (e.g., Philadelphia) and a second audience configuration associated with panelists who accessed the second media (e.g., "Dancing with the Stars") via the second media station (e.g., ABC National TV Station) within the second DMA (e.g., New York City). For example, the first audience configuration may be skewed towards a first example end of an audience configuration spectrum (e.g., a greater percentage of male panelists), while the second audience configuration may be skewed towards a second example end of the audience configuration spectrum (e.g., a greater percentage of female panelists). However, other example audience configurations and/or example demographic configurations may additionally or alternatively be determined, such as an example audience configuration heavily skewed towards younger viewers, an example audience configuration heavily skewed towards married viewers, etc.

In some examples, the first audience configuration of the tuning panelists in tuning households may be unknown, while the second audience configuration of the viewing panelists in learning households may be known. To determine the first audience configuration, disclosed examples may use the second audience configuration as a basis to identify the first audience configuration. Although, the second audience configuration of the viewing panelists in learning households may be known to skew towards the second example end of the audience configuration spectrum (e.g., greater percentage of female panelists), example AM systems disclosed herein may use the second audience configuration to determine the identity of the first audience configuration because (1) the first audience configuration is unknown and, therefore, may have a similar audience configuration to the second audience configuration, and (2) the first example media station (e.g., ABC Philadelphia) and the second example media station (e.g., ABC National TV media station) are affiliated with or related to one another (e.g., both media stations are owned and/or operated by ABC) and may produce similar audience configurations.

In some examples, estimating the first audience configuration of the tuning panelists in tuning households based on the second audience configuration may produce an example first audience configuration estimation skewed towards the second end of the audience configuration spectrum (e.g., a greater percentage of female panelists), thus producing an example imputation error. For example, an example imputation error may include matching media consumption behavior of a male tuning panelist in a tuning household in Philadelphia watching the professional football game with the media consumption behavior of a female learning panelist in a learning household in New York City watching "Dancing with the Stars." As illustrated in the above example imputation error, a localized event may result in unwanted example effects such as, for example, inducing a local bias in the audience configuration of panelists within a DMA where the localized event occurs. Such imputation errors may result in, for example, inaccurate ratings information leading to potentially incorrect advertising prices that are intended to be commensurate with a predicted audience exposure and/or demographic makeup.

Examples disclosed herein account for a localized event by performing a localized event adjustment. For example, disclosed examples perform a localized event adjustment in a DMA by identifying a heavily exposed data set for collected media consumption behavior. In some such examples, disclosed examples may analyze (e.g., iteratively analyze) one or more media stations for a plurality of time periods (e.g., one or more quarter-hours over a period of time). The heavily exposed data set identifies data associated with panelists that are heavily exposed to a media station in comparison to additional media stations. The identified heavily exposed data set may exhibit one or more characteristics of localized event media consumption behavior. In the illustrated examples, a data set is identified as a "heavily exposed" data set when (1) a percentage of the analyzed exposure minutes satisfies a first threshold for exposure to a specified media station (e.g., at least 20 percent of exposure minutes during a time period are exposed to a specified media station), and (2) a number of households exposed to the specified media station satisfies a second threshold for a total number of homes exposed to a specified media station (e.g., at least 60 households during the time period are exposed to the specified media station). Recipient data that qualifies as "heavily exposed" is referred to herein as "heavily tuned" data. Donor data that qualifies as "heavily exposed" is referred to herein as "heavily viewed" data.

In some disclosed examples, example AM systems perform a localized event adjustment in a DMA when a localized event is responsible for at least one heavy tuning time period (e.g., a specified quarter-hour during which "heavy tuning" occurs). In some disclosed examples, example AM systems identify media comparable to media identified in at least one heavy tuning time period (e.g., a specified quarter-hour during which "heavy tuning" occurs). In the illustrated examples, media that is comparable to identified media (e.g., comparable media) refers to one or more media stations and/or media genres that present media that is affiliated with, associated with and/or related to (e.g., comparable to) the identified media. For example, a first example media station (e.g., ESPN) and a second example media station (e.g., ESPN2) may be determined to be comparable media when the first media station (e.g., ESPN) is affiliated with and/or associated with the second media station (e.g., ESPN2). In some examples, the first media station (e.g., ESPN) and the second media station (e.g., ESPN2) may present media of a related genre. For example, the first media station (e.g., ESPN) may display a professional football game and the second media station (e.g., ESPN2) may display a college football game. In the illustrated example, the professional football game may be classified in the "football" media genre and the college football game may be classified as a related media genre (e.g., sports) and/or may be classified as the same example media genre (e.g., football).

In some disclosed examples, example AM systems determine if a localized event is responsible for the one or more heavy tuning time periods. For example, disclosed examples may analyze media consumption behavior for a plurality of comparable media rather than just analyzing media consumption behavior for one media station and/or one media genre. For example, if a single local media station displaying a single media genre is analyzed for panelist media consumption behavior, it may not be apparent if a localized event is influencing the audience configuration of the local media station displaying the single media genre. However, by analyzing comparable media, disclosed examples may determine whether the audience configuration of the local media station does not match the audience configuration of the comparable media, where the comparable media may include the national media station of the local media station and/or additional related media stations of the local media station. In the illustrated example above, the mismatch of audience configurations may be the result of a localized event influencing one or both audience configurations.

Examples disclosed herein analyze (e.g., iteratively analyze) one or more heavy tuning time periods (e.g., quarter-hours) and determine comparable media for the media identified in the heavy tuning time periods. In some instances, disclosed examples determine an example percentage of tuning minutes associated with and/or credited to tuning panelists in tuning households tuning to example comparable media (e.g., a media station and/or a media genre comparable to the identified media) with respect to a total number of tuning minutes for a plurality of media stations (e.g., a "comparable media tuning percentage"). In some instances, disclosed examples analyze (e.g., iteratively analyze) the same time periods as the heavy tuning time periods for comparable media consumption behavior. In some examples, disclosed examples determine an example percentage of viewing minutes associated with and/or credited to viewing panelists in learning households viewing the same example comparable media (e.g., a media station and/or a media genre comparable to the identified media) with respect to a total number of viewing minutes for the example plurality of media stations (e.g., a "comparable media viewing percentage").

In some examples, disclosed techniques determine an example differential between the comparable media tuning percentage and the comparable media viewing percentage (e.g., a "comparable media percentage differential"). For example, a localized event may be identified if the comparable media percentage differential satisfies a comparable media percentage differential threshold (e.g., the comparable media percentage differential is at least 5 percent, etc.). In some examples, if the comparable media percentage differential satisfies the comparable media percentage differential threshold, then disclosed examples define the recipient data identified as heavily exposed as Localized Event Recipient Cutback (LERC) data.

In some examples, disclosed techniques for performing a localized event adjustment during a viewer assignment process in a specified DMA may also include identifying a custom data pool associated with viewing panelists in learning households exhibiting media consumption behavior that may be similar to media consumption behavior influenced by a localized event (sometimes referred to herein as a "custom local bias donor data pool"). In some examples, the custom data pool associated with viewing panelists in learning households are in the same specified DMA as the LERC data. In some examples, the custom data pool includes data associated with viewing panelists in learning households inside the same specified DMA as the LERC data and outside the same specified DMA as the LERC data.

In some examples disclosed herein, example AM systems analyze donor data to identify the custom localized event donor data pool. For example, disclosed examples may analyze (e.g., iteratively analyze) donor data associated with one or more media stations for a plurality of quarter-hours. For example, AM systems may determine that analyzed donor data satisfies a first threshold (e.g., a "viewing percentage threshold") and satisfies a second threshold (e.g., a "learning household total number threshold"). In some examples, donor data satisfying the first threshold and the second threshold are identified as heavily viewed data. Disclosed examples may define the heavily viewed data as the custom localized event donor data pool.

In some examples disclosed herein, disclosed techniques match the LERC data to the custom localized event donor data pool. For example, the localized event donor data pool may resemble a pool of panelists exhibiting media consumption behavior influenced by a localized event. Referring to the above example regarding imputation errors when matching tuning panelists in the first example DMA (e.g., Philadelphia) watching the first media (e.g., the professional football game) with viewing panelists in the second example DMA (e.g., New York City) watching the second media (e.g., "Dancing with the Stars"), disclosed examples may expand the learning household pool to include viewing panelists in learning households from a third example DMA (e.g., Chicago). In some such examples, example AM systems may identify a third audience configuration when viewing panelists in the third example DMA (e.g., Chicago) are watching third example media (e.g., a professional football game featuring the Chicago Bears) broadcast on a third example media station (e.g., ABC Chicago). Disclosed examples may impute demographics for the first audience configuration associated with the first example DMA (e.g., Philadelphia) based on the third audience configuration associated with the third example DMA (e.g., Chicago). In such an example, the example tuning panelists within the first example DMA (e.g., Philadelphia) may be matched with the viewing panelists within the third example DMA (e.g., Chicago), where the audiences in the first example DMA and the third example DMA may be exhibiting media consumption behavior indicative of a localized event influence, and thus, may be helpful in reducing imputation errors.

In some examples disclosed herein, donor data associated with the custom localized event donor data pool that is characterized as heavily viewed and/or heavily exposed data is defined as Localized Event Donor Cutback (LEDC) data. For example, the LEDC data may include data associated with viewing panelists in learning households exhibiting localized event media consumption behavior. In some examples, LEDC data associated with the custom localized event donor data pool is matched with LERC data associated with tuning panelists exhibiting media consumption behavior influenced by a localized event.

In some disclosed examples, the example AM system performs a localized event adjustment in a specified DMA by assigning probabilities to the viewing panelists and to the tuning panelists, and performing an example matching process. In some disclosed examples, a probability engine performs a probability assignment process using, for example, specifications for assignment of probabilities. However, in some examples, probability assignments may be altered by performing localized event adjustments. In some examples, when performing a localized event adjustment, the example probability engine assigns a first probability to recipient data exhibiting a local bias and matches corresponding donor data exhibiting the local bias to the recipient data. Similarly, example AM systems may assign a second probability to recipient data not exhibiting a local bias and may match the identified recipient data with corresponding donor data not exhibiting a local bias. In some example implementations, example AM systems may assign the first probability to the recipient data exhibiting the local bias and match the identified recipient data with the corresponding donor data exhibiting the local bias, while discarding data (e.g., donor data and/or recipient data) not exhibiting a local bias.

In some examples, when an example localized event adjustment is performed, the example probability engine determines (1) a first set of probabilities for the recipient data and the donor data exhibiting a local bias and (2) a second set of probabilities for the recipient data and the donor data not exhibiting a local bias. Upon assigning the probabilities for the recipient data and the donor data, an example most-likely viewer (MLV) engine may use the determined probabilities to identify which example tuning household(s) best match with corresponding learning household(s). In some examples, the MLV engine may also impute viewing behavior information of the members of the matched example learning household(s) to the corresponding members of the example tuning household(s). For example, the MLV engine may impute viewing behavior information by matching LERC data associated with tuning panelists in tuning households exhibiting localized event media consumption behavior to LEDC data associated with viewing panelists in learning households. The example MLV engine may additionally or alternatively impute viewing behavior information by matching non-LERC data associated with tuning panelists in tuning households exhibiting non-localized event media consumption behavior to non-LEDC data associated with viewing panelists in non-learning households.

As disclosed herein, imputation errors may be reduced through processes that enhance a viewer assignment (VA) process in addition to making a localized event adjustment. In some examples, example AM systems may not utilize a localized event adjustment process during the VA process. For example, example AM systems may not utilize a localized event adjustment process during the VA process in cases where only one DMA of interest is being analyzed. In some such examples when only one DMA of interest is being analyzed, example AM systems may use (e.g., exclusively use) tuning panelists and viewing panelists in the DMA of interest without a need to expand to additional DMAs of interest.

In some disclosed examples, example AM systems may reduce imputation errors by adjusting VA performance among households with only two occupants (e.g., households of size 2). Such an example adjustment may include comparing a first household of size 2 with a second household of size 2 instead of comparing a first household of size 2 to a third household not of size 2 (e.g., a household of size 1 or a household of size 3 or more). Such an example adjustment of comparing the first household of size 2 with the second household of size 2 may improve VA accuracy (e.g., improved accuracy for assigning male gender viewers) for specified media events (e.g., broadcast supporting events) because a household size 2 home has an increased likelihood of having two persons similar in age with similar media consumption behaviors. In some examples, adjusting VA performance among households with only two occupants is carried out when donor matching is performed and may include separating out household size 2 homes with one or both person(s) that satisfy an age threshold (e.g., greater than or equal to 55 years old) from those household size 2 homes where both persons fail to satisfy the age threshold (e.g., both household members are less than 55 years old). In general, both members of household size 2 homes are approximately the same age. Thus, when a household size 2 home has one person who satisfies an age threshold, the other household member is also likely to satisfy the age threshold.

Furthermore, viewing behaviors of household size 2 homes may differ based on whether at least one household member satisfies the age threshold. For example, household members in household size 2 homes where at least one household member satisfies the age threshold may be more likely to watch media together and may more likely be viewing local news or syndication programs. In other examples, household members in household size 2 homes where neither household member satisfies the age threshold (e.g., young couples, single-parent homes, etc.) may not watch media together. As a result, in some examples, disclosed examples process household size 2 homes separately from non-household size 2 homes when performing matching processes. For example, the example MLV engine may use (1) the assigned probabilities for the recipient data and the donor data and (2) whether the corresponding households are household size 2 homes or non-household size 2 homes when identifying example tuning household(s) best match with corresponding learning household(s).

Disclosed examples may also reduce imputation errors and improve viewer assignment by expanding a learning household pool used by the example MLV engine. For example, expanding the learning household pool may improve the matching accuracy and/or reduce gender skew for specified media events (e.g., broadcast sporting events). For example, disclosed examples may expand the learning household pool to encompass a collection of learning households within an example geographical area encompassing, for example, an entire country (e.g., a complete national people meter sample). In some examples, the expanding of the learning household pool may be applied to the probability calculation phase. By expanding the learning household pool, disclosed examples may reduce imputation errors by, for example, improving accuracy when assigning donor data associated with viewing panelists within learning households to corresponding recipient data associated with tuning panelists within tuning households.

In some disclosed examples, the example AM system may reduce imputation errors by adjusting tuning quantile dimension(s) during the matching phase of the VA process. For example, the disclosed example AM system may verify that households are matched to other households with similar tuning behavior and/or media consumption behavior. For example, disclosed examples may double the number of donors available for matching by classifying tuning behavior as either "heavy tuning" or "low tuning" (e.g., using a 2-way variable) instead of classifying tuning behavior using a 4-way variable (e.g., "heavy-heavy tuning," "low-heavy tuning," "heavy-low tuning," or "low-low tuning"). In some examples, adjusting the tuning quantile dimension(s) may be used when processing media consumption behavior related to a localized event. In some instances, adjusting the tuning quantile dimension(s) may be used when processing media consumption behavior not related to the localized event.

Turning to FIG. 1, an example media distribution environment 100 includes a first example designated market area (DMA) 102 and a second example DMA 104. While the illustrated example of FIG. 1 includes two example DMAs 102,104, other example environments may additionally or alternatively include any number of DMAs. The first example DMA 102 includes first example learning households 108 and first example tuning households 110 communicatively connected to an example network 106. As described below, in the illustrated example, the first example DMA 102 has an example localized event (e.g., a localized media event) occurring, which induces an example bias (e.g., a local bias) in the media consumption behavior of the viewing panelists in the first example learning households 108 and/or the tuning panelists in the first example tuning households 110.

In the illustrated example of FIG. 1, the second example DMA 104 includes second example learning households 112 and second example tuning households 114 communicatively connected to the network 106. In the illustrated example, the second example DMA 104 does not have a localized event (e.g., a localized media event) occurring. However, in some examples, a localized event (e.g., a localized media event) may additionally or alternatively occur in the second example DMA 104, thereby inducing an example bias (e.g., a local bias) in the media consumption behavior of the viewing panelists in the second example learning households 112 and/or the tuning panelists in the second example tuning households 114.

In the illustrated example of FIG. 1, the first example learning households 108 and the second example learning households 112 include People Meter (PM) devices to (1) capture media exposure information and to (2) identify a corresponding panelist household member(s) consuming the media. The first example tuning households 110 and the second example tuning households 114 of FIG. 1 include media meter (MM) devices to capture media exposure information without identification of which household panelist member(s) is/are responsible for consuming the media. Accordingly, examples disclosed herein improve accuracy and/or reliability of predictions of which household members in the tuning households are deemed to be viewers of (e.g., are exposed to) media during a time period (e.g., viewers of media during a specified day, quarter-hour, daypart, etc.). For example, errors may be reduced by imputing known viewing behavior in the learning households 108,112 obtained via PM devices to unknown viewing behavior in the tuning households 110,114 obtained via MM devices.

In the illustrated example of FIG. 1, behavior information collected from the households 108, 110, 112, 114 of the DMAs 102, 104 is sent to an example viewer assignment engine 120 for analysis via the example network 106. The example network 106 of the illustrated example of FIG. 1 is the Internet. However, the example network 106 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 106 enables the example viewer assignment engine 120 to be in communication with the first example learning households 108, the first example tuning households 110, the second example learning households 112 and the second example tuning households 114 of the DMAs 102,104. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the example viewer assignment engine 120 performs viewer assignment of panelists included in the tuning households 110,114 based on the panelists included in the learning households 108,112. For example, the viewer assignment engine 120 may identify most likely viewers of media in the tuning households 110,114 based on viewers included in the learning households 108,112, respectively. In some examples, the viewer assignment engine 120 may determine that a localized event is occurring in a DMA (e.g., the first example DMA 102). In some such examples, the example viewer assignment engine 120 identifies a DMA exhibiting a similar local bias and uses the panelists in the identified DMA to perform viewer assignment of the panelists in the first example DMA 102. The example viewer assignment engine 120 of FIG. 1 includes an example collection engine 130, an example database 136, an example localized event engine 140, an example probability engine 160 and an example most likely viewer (MLV) engine 170. The example collection engine 130 of FIG. 1 includes an example learning household interface 132 and an example tuning household interface 134. The example probability engine 160 of FIG. 1 includes an example localized event probability calculator 162 and an example non-localized event probability calculator 164. The example MLV engine 170 of FIG. 1 includes an example localized event MLV selector 172 and an example non-localized event MLV selector 174.

In the illustrated example of FIG. 1, the example viewer assignment engine 120 includes the example collection engine 130 to query, filter, obtain and/or process panelist data (e.g., media consumption behavior data, tuning behavior data, viewing behavior data, etc.) based on at least one demographic (e.g., a gender, an age, an income category, etc.) and/or filtering parameter (e.g., panelists viewing a specified media station, viewing media during a specified time period (e.g., Monday from 7-7:15 pm, etc.)) of interest. The example collection engine 130 stores the obtained panelist data in the example database 136. In some examples, the example collection engine 130 determines an order of the data provided to the example viewer assignment engine 120 for processing. For example, the collection engine 130 may process the data in the database 136 by sorting the data in a data structure such as, for example, an array, a list, a table, etc. based on a timestamp, a number of exposure minutes, a number of exposure households, etc. In some examples, the example collection engine 130 provides (e.g., sequentially provides) data in the example database 136 to the example localized event engine 140, the example probability engine 160 and/or the example MLV engine 170 for processing. For example, the collection engine 130 may sequentially provide data in the database 136 to the localized event engine 140 and continue to provide the data until all of the data has been provided to the localized event engine 140.

In the illustrated example of FIG. 1, the example collection engine 130 may obtain example viewing panelist data (e.g. viewing behavior data, media consumption behavior data, etc.) from the first example learning households 108 and the second example learning households 112 via the example learning household interface 132. The example learning household interface 132 of FIG. 1 stores the obtained viewing panelist data in the example database 136. The example learning household interface 132 interfaces with the first example learning households 108 and the second example learning households 112 that include PM devices to capture media consumption information and identify a respective panelist household member(s) consuming the corresponding media. For example, the collection engine 130 may cause the learning household interface 132 to retrieve and/or otherwise obtain corresponding viewing minutes from the example learning households 108,112 that match specified filtering categories and/or parameters (sometimes referred to herein as demographic dimensions) and store data related to the tuning minutes in the example database 136. In the illustrated examples, a demographic dimension may represent a category that incorporates one or more parameters such as males age 35-54. In some examples, the example collection engine 130 causes the learning household interface 132 to query and/or filter one or more example candidate learning households (e.g., first example learning households 108, second example learning households 112, etc.) for analysis, comparison and/or imputation purposes.

In the illustrated example of FIG. 1, the example collection engine 130 obtains example tuning panelist data (e.g., media consumption behavior data, tuning behavior data, etc.) from the first example tuning households 110 and the second example tuning households 114 via the example tuning household interface 134. The example tuning household interface 134 of FIG. 1 stores the obtained tuning panelist data in the example database 136. The example tuning household interface 134 interfaces with the first example tuning households 110 and the second example tuning households 114, which include MM devices, to capture media consumption information that is not associated with user identification of which household panelist member(s) is/are responsible for consuming the corresponding media. For example, the collection engine 130 may cause the tuning household interface 134 to retrieve and/or obtain tuning minutes from the example tuning households 110,114 that match one or more demographic dimensions and store the retrieved data satisfying the specified demographic dimensions in the example database 136. In some examples, the example collection engine 130 causes the example tuning household interface 134 to query and/or filter one or more example candidate tuning households (e.g., first example tuning households 110, second example tuning households 114, etc.) for analysis, comparison and/or imputation purposes.

In the illustrated example of FIG. 1, the example viewer assignment engine 120 includes the example database 136 to record data (e.g., tuning panelist data, viewing panelist data, etc.) obtained by the audience measurement system(s) deployed in the example DMA 102,104 via the example learning household interface 132 and/or the tuning household interface 134. In some examples, the example database 136 records a flag and/or a variable associated with the obtained data. For example, the database 136 may record a flag associated with the obtained data that may be set by the viewer assignment engine 120 if the obtained data satisfies a condition. The example database 136 may respond to queries for information related to data in the database 136. For example, the database 136 may respond to queries for additional data by providing the additional data, by providing an index associated with the additional data in the database 136, etc. The example database 136 may additionally or alternatively respond to queries when there is no additional data in the database 136 by providing a null index, an end of database 136 identifier, etc. The example database 136 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 136 may additionally or alternatively be implemented by one or more double data rate (DDR) memories, such as DDR, DDR2, DDR3, mobile DDR (mDDR), etc. The example database 136 may additionally or alternatively be implemented by one or more mass storage devices such as hard disk drive(s), compact disk drive(s) digital versatile disk drive(s), etc. While in the illustrated example the database 136 is illustrated as a single database, the database 136 may be implemented by any number and/or type(s) of databases.

In the illustrated example of FIG. 1, the example viewer assignment engine 120 includes the example localized event engine 140 to determine if media consumption behavior of tuning panelists in tuning households is influenced (e.g., biased) by a localized event. As described below in connection with FIG. 2, the example localized event engine 140 analyzes media consumption behavior of tuning panelists in the first example tuning households 110 for media comparable to the media station(s) and/or media genre(s) included in the media consumption behavior (e.g., a comparable media station, a comparable media genre, etc.) associated with the tuning panelists in the first example tuning households 110 during heavily tuned time periods (e.g., quarter-hours). In the illustrated example, the example localized event engine 140 analyzes the media consumption behavior of viewing panelists in the first example learning households 108 and tuning panelists in the first example tuning households 110 for the identified comparable media during the heavily tuned quarter-hours. In the illustrated example of FIG. 1, the example localized event engine 140 determines if a difference between the media consumption behavior of the first example learning households 108 and the media consumption behavior of the first example tuning households 110 satisfies an example threshold (e.g., a comparable media percentage differential threshold, a localized event threshold, etc.). If the example localized event engine 140 determines that the difference satisfies the example threshold, then the localized event engine 140 identifies the recipient data associated with the tuning panelists in the first example tuning households 110 as LERC data. In the illustrated example, the example localized event engine 140 determines that the media consumption behavior of tuning panelists in the first example tuning households 110 are influenced by a localized event.

In the illustrated example of FIG. 1, the example localized event engine 140 identifies a custom pool of learning households exhibiting similar media consumption behaviors to the first example tuning households 110 exhibiting the localized event media consumption behavior. In some examples, the example localized event engine 140 identifies the donor data associated with the identified custom pool of learning households as LEDC data. In some examples, the custom pool of learning households includes learning households that are in the same DMA as the recipient data exhibiting the localized event media consumption behavior and/or in a different DMA from the recipient data exhibiting the localized event media consumption behavior. For example, the custom pool of learning households may include none, some, or all of the first example learning households 108 in the first example DMA 102 and/or none, some, or all of the second example learning households 112 in the second example DMA 104.

In the illustrated example of FIG. 1, the example viewer assignment engine 120 includes the example probability engine 160 to calculate probabilities for imputing tuning panelists in the first example tuning households 110 and/or the second example tuning households 114. In some examples, the example probability engine 160 calculates a total probability for a panelist in an example panelist household (e.g., a tuning household, a learning household, etc.). For example, the probability engine 160 may use example Equation (1) below to calculate the total probability for a panelist.

$$\text{Tot. Probability}(j) = \frac{\sum \text{Exposure Minutes for } j}{\sum \text{Potential Exposure Minutes for } j}$$

In the illustrated example of Equation (1), the variable "j" represents a selected panelist demographic dimension of interest, such as, for example, males age 35-54. In example Equation (1) above, the total probability for a selected demographic dimension "j" is calculated as a ratio of (1) a sum of the example exposure minutes (e.g., tuning minutes, viewing minutes, etc.) for the selected demographic dimension "j" and (2) a sum of the example exposure minutes for the selected demographic dimension "j."

For example, assume that a plurality of households containing the following demographic dimensions are chosen for processing: three (3) household members including one child and two (2) adults, where one (1) adult is a male age 35-54. In this example, assume that males age 35-54 are associated with a total of 1850 exposure minutes. Also in this example, assume that other household members of interest under analysis (e.g., females age 35-54 and children age 2-11) account for a total of 2500 exposure minutes within those respective households. In the illustrated example, minutes associated with other household members are deemed "potential exposure minutes" because of the possibility that the other household members may have also been viewing media at the same time as the members of the male age 35-54 demographic. Applying the example scenario above to example Equation (1) above, the example probability engine 160 calculates a total probability for males age 35-54 as 0.74 (e.g., 1850/2500=0.74).

In some examples, the example probability engine 160 calculates a total probability for a plurality of demographic dimensions. However, a panelist may fit two or more demographic dimensions and therefore exposure minutes of a panelist may be credited to the two or more demographic dimensions. The output of the example probability engine 160 crediting exposure minutes of the panelist to the two or more demographic dimensions may produce overlapping media consumption behavior information used by the example viewer assignment engine 120. For example, the probability engine 160 may perform a total probability calculation which credits a number of viewing minutes that the viewing panelist views media to each demographic dimension that fits the viewing panelist such as, for example, (1) being male, (2) between the age range 35-54 and (3) residing in Chicago. If the example viewer assignment engine 120 analyzes the total probability value calculated by the example probability engine 160 for each demographic dimension (e.g., gender, age and location) separately, then the viewer assignment engine 120 may identify each total probability value associated with the viewing panelist as separate media consumption behavior and/or as a separate panelist instead of one panelist fitting multiple demographic dimensions having one media consumption behavior.

In the illustrated example of FIG. 1, the example probability engine 160 processes a plurality of calculated total probability values for a panelist to reduce overlapping media consumption behavior information. In some examples, the example probability engine 160 calculates a final probability for each calculated total probability. In the illustrated example, the final probability is calculated by scaling the total probability using one or more scaling factors to reduce overlapping media consumption behavior information. For example, the probability engine 160 may use example Equation (2) below to calculate the final probability for each calculated total probability.

$$\text{Final Probability} = \frac{\text{Adjusted Probability}(j, d)}{[1 + \text{Adjusted Probability}(j, d)]} \quad \text{Equation (2)}$$

In the illustrated example of Equation (2), the variable "j" represents a selected panelist demographic dimension of interest, such as, for example, males age 35-54. The variable "d" represents an additional panelist demographic dimension of interest, such as, for example, panelists viewing media in Chicago. In example Equation (2) above, the adjusted probability represents a scaled version of the total probability calculated by the example Equation (1) above. In some examples, the example probability engine 160 may use example Equation (2) above to analyze media consumption behavior of a panelist from the perspective of one or more demographic dimension(s) to reduce the effect of redundant media consumption behavior analysis.

In some examples, the example probability engine 160 calculates an average probability value by calculating an average final probability across all quarter hours within the demographic dimension(s) of interest (e.g. an "average probability"). For example, the probability engine 160 may use Equation (3) below to calculate the average probability.

$$\text{Avg. Probability}(j) = \frac{\sum \text{Final Probabilies for } j}{\sum \text{Number of Final Probabilities for } j} \quad \text{Equation (3)}$$

In the illustrated example of Equation (3), the variable "j" represents a selected panelist demographic dimension of interest, such as, for example, males age 35-54. By using Equation (3) above, the example probability engine 160 calculates an average probability for a selected panelist demographic dimension "j" as a ratio of (1) a sum of final probabilities for the selected panelist demographic dimension "j" for at least one quarter-hour and (2) a sum of a number of final probabilities calculated for the selected panelist demographic dimension "j."

The example probability engine 160 of FIG. 1 includes the example localized event probability calculator 162 and the example non-localized event probability calculator 164. The example localized event probability calculator 162 selects (1) recipient data exhibiting localized event media consumption behavior (e.g., LERC data) and (2) donor data exhibiting localized event media consumption behavior (e.g., LEDC data). The example localized event probability calculator 162 of FIG. 1 calculates probabilities for and/or assigns probabilities to LERC data associated with tuning panelists in the first example tuning households 110. The example localized event probability calculator 162 of FIG. 1 also calculates probabilities for and/or assigns probabilities to LEDC data associated with viewing panelists in the first example learning households 108. In some examples, the example localized event probability calculator 162 may calculate probabilities for and/or assign probabilities to data associated with tuning panelists in the second example tuning households 114 and/or viewing panelists in the second example learning households 112. For example, if there are fewer viewing panelists in the first learning households 108 available to match with the tuning panelists in the first tuning households 110, then the localized event engine 140 may identify a number of viewing panelists in the learning households 110 to match with the unmatched tuning panelists. The example localized event probability calculator 162 may then calculate probabilities for and/or assign probabilities to data associated with the viewing panelists in the second example learning households 112. In some examples, the example localized event probability calculator 162 calculates probabilities using example Equations (1)-(3) above.

In the illustrated example of FIG. 1, the example non-localized event probability calculator 164 selects recipient data not exhibiting localized event media consumption behavior (e.g., non-LERC data) and/or donor data not exhibiting localized event media consumption behavior (e.g., non-LEDC data). The example non-localized event probability calculator 164 of FIG. 1 calculates probabilities for and/or assigns probabilities to non-LERC data associated with tuning panelists in the second example tuning households 114. The example non-localized event probability calculator 164 of FIG. 1 also calculates probabilities for and/or assigns probabilities to non-LEDC data associated with viewing panelists in the second example learning households 112. However, in some examples, the example non-localized event probability calculator 164 may calculate probabilities for and/or assign probabilities to data associated with tuning panelists in the first example tuning households 110 and/or viewing panelists in the first example learning households 108 during non-heavily tuned and/or non-heavily exposed time periods (e.g., quarter-hours in which a localized event is not biasing media consumption behavior). In some examples, the example non-localized event probability calculator 164 calculates probabilities using example Equations (1)-(3) above.

In the illustrated example of FIG. 1, the example viewer assignment engine 120 includes the example MLV engine 170 to determine imputations and/or matches for tuning panelists in the first example tuning households 110 and the second example tuning households 114 based on probabilities assigned to and/or calculated by the example probability engine 160. In some examples, the example MLV engine 170 uses the probability values calculated by the example probability engine 160 to identify matches of each media presentation device within the first example tuning households 110 and the second example tuning households 114 so that the viewing behaviors of each media presentation device from the members of the first example learning households 108 and the second example learning households 112 may be imputed to the corresponding members of the matching example tuning households.

In some examples, the example MLV engine 170 matches a first tuning panelist in the first example tuning household 110 with a first example learning panelist in an example learning household of the first example learning households 108 or the second example learning households 112. For example, the MLV engine 170 of FIG. 1 may calculate a difference between the average probability values for the first tuning panelist and the first learning panelist. In some examples, the example MLV engine 170 calculates differences for additional panelists in the households of the first tuning panelist and the first learning panelist. For example, the MLV engine 170 may calculate the difference between the average probabilities of the second tuning panelist and the second learning panelist (1) if there is a second tuning panelist in the same tuning household as the first tuning panelist, and (2) if there is a second learning panelist in the same learning household as the first learning panelist.

In some examples, the example MLV engine 170 of FIG. 1 calculates an MLV score by summing the difference values of the average probabilities within the household. For example, the MLV engine 170 may calculate an MLV score by summing (1) the difference between the average probability values for the first tuning panelist and the first learning panelist and (2) the difference between the average probability values for the second tuning panelist and the second learning panelist. In the illustrated example, an MLV score value that is relatively lower compared to another MLV score value indicates a greater degree of similarity between the compared persons of a tuning household and a learning household. In some examples, the example MLV engine 170 identifies tuning households and learning households that have similar MLV scores to determine if they can be matched with each other. For example, the MLV engine 170 may identify a tuning household with an MLV score of 0.12 and a learning household with an MLV score of 0.10. The example MLV engine 170 may calculate an absolute difference between the two scores to be 0.02 (e.g., 0.12−0.10=0.02). The example MLV engine 170 may also verify that there are no additional learning households that can be paired with the tuning household having the MLV score of 0.12 that would produce an absolute difference less than 0.02.

In some examples, the example MLV engine 170 may identify a match between a tuning panelist and a learning panelist if a calculated average probability associated with the tuning panelist and the learning panelist satisfies a threshold (e.g., a panelist having an average probability greater than 0.70, etc.). For example, the MLV engine 170 may identify a tuning panelist in a first example tuning household 110 with a calculated average probability of 0.71. The example MLV engine 170 may also identify a learning panelist in a first example learning household 108 with a calculated average probability of 0.75. The example MLV engine 170 may match the tuning panelist with the learning panelist because the calculated average probabilities associated with the tuning panelist and the learning panelist is greater than the threshold of 0.7 used by the MLV engine 170 for matching panelists.

In some examples, the example MLV engine 170 determines imputations and/or matches for tuning panelists in the first example tuning households 110 and the second example tuning households 114 based household sizes. For example, the MLV engine 170 may separate household size 2 homes from non-household size 2 homes when determining imputations and/or matches. The example MLV engine 170 may include household sizes when performing matches for localized event data and for non-localized event data.

In the illustrated example of FIG. 1, the example MLV engine 170 includes the example localized event MLV selector 172 to match LERC data associated with tuning panelists in the first example tuning households 110 exhibiting localized event media consumption behavior to LEDC data associated with viewing panelists in the first example learning households 108 and/or viewing panelists in the second example learning households 112. For example, the localized event MLV selector 172 may match a tuning panelist in a tuning household 110 exhibiting a first localized event media consumption behavior and a viewing panelist in a learning household 108 exhibiting a second localized event media consumption behavior because the tuning household 110 and the learning household 108 have a similar MLV score. In another example, the localized event MLV selector 172 may match the tuning panelist in the tuning household 110 exhibiting the first localized event media consumption behavior with the viewing panelist in the learning household 108 exhibiting the second localized event media consumption behavior because the calculated average probabilities associated with the tuning panelist and the viewing panelist satisfies a threshold (e.g., the calculated average probability associated with the panelist is greater than 0.7, etc.).

In the illustrated example of FIG. 1, the example MLV engine 170 of FIG. 1 includes the example non-localized event MLV selector 174 to match non-LERC data associated with tuning panelists in the second example tuning households 114 exhibiting non-localized event media consumption behavior to non-LEDC data associated with viewing panelists in the first example learning households 108 and/or viewing panelists in the second example learning households 112. For example, the non-localized event MLV selector 174 may match a tuning panelist in a tuning household 114 exhibiting a first localized event media consumption behavior and a viewing panelist in a learning household 112 exhibiting a second localized event media consumption behavior because the tuning household 114 and the learning household 112 have a similar MLV score. In another example, the non-localized event MLV selector 174 may match the tuning panelist in the tuning household 114 exhibiting the first localized event media consumption behavior with the viewing panelist in the learning household 112 exhibiting the second localized event media consumption behavior because the calculated average probabilities associated with the tuning panelist and the viewing panelist satisfies a threshold (e.g., the calculated average probability associated with the panelist is greater than 0.7, etc.).

While an example manner of implementing the example viewer assignment engine 120 is illustrated in FIG. 1, one or more of the elements, processes and/or devices illustrated in FIG. 1 may be combined, divided, re-arranged, omitted, eliminated and/or implemented in any other way. Further, the example collection engine 130, the example learning household interface 132, the example tuning household interface 134, the example database 136, the example localized event engine 140, the example probability engine 160, the example localized event probability calculator 162, the example non-localized event probability calculator 164, the example most likely viewer engine 170, the example localized event MLV selector 172, the example non-localized event MLV selector 174 and/or, more generally, the example viewer assignment engine 120 of FIG. 1 may be implemented by hardware, software, firmware and/or any combination of hardware, software and/or firmware. Thus, for example, any of the example collection engine 130, the example learning household interface 132, the example tuning household interface 134, the example database 136, the example localized event engine 140, the example probability engine 160, the example localized event probability calculator 162, the example non-localized event probability calculator 164, the example most likely viewer engine 170, the example localized event MLV selector 172, the example non-localized event MLV selector 174 and/or, more generally, the example viewer assignment engine 120 of FIG. 1 may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 130, the example learning household interface 132, the example tuning household interface 134, the example database 136, the example localized event engine 140, the example probability engine 160, the example localized event probability calculator 162, the example non-localized event probability calculator 164, the example most likely viewer engine 170, the example localized event MLV selector 172, the example non-localized event MLV selector 174 and/or, more generally, the example viewer assignment engine 120 of FIG. 1 is hereby expressly defined to include a tangible computer readable storage device or storage disk such as a memory, a digital versatile disk (DVD), a compact disk (CD), a Blu-ray disk, etc. storing the software and/or firmware. Further still, the example viewer assignment engine 120 of FIG. 1 may include one or more elements, processes and/or devices in addition to, or instead of, those illustrated in FIG. 1, and/or may include more than one of any or all of the illustrated elements, processes and devices.

Figure 2:
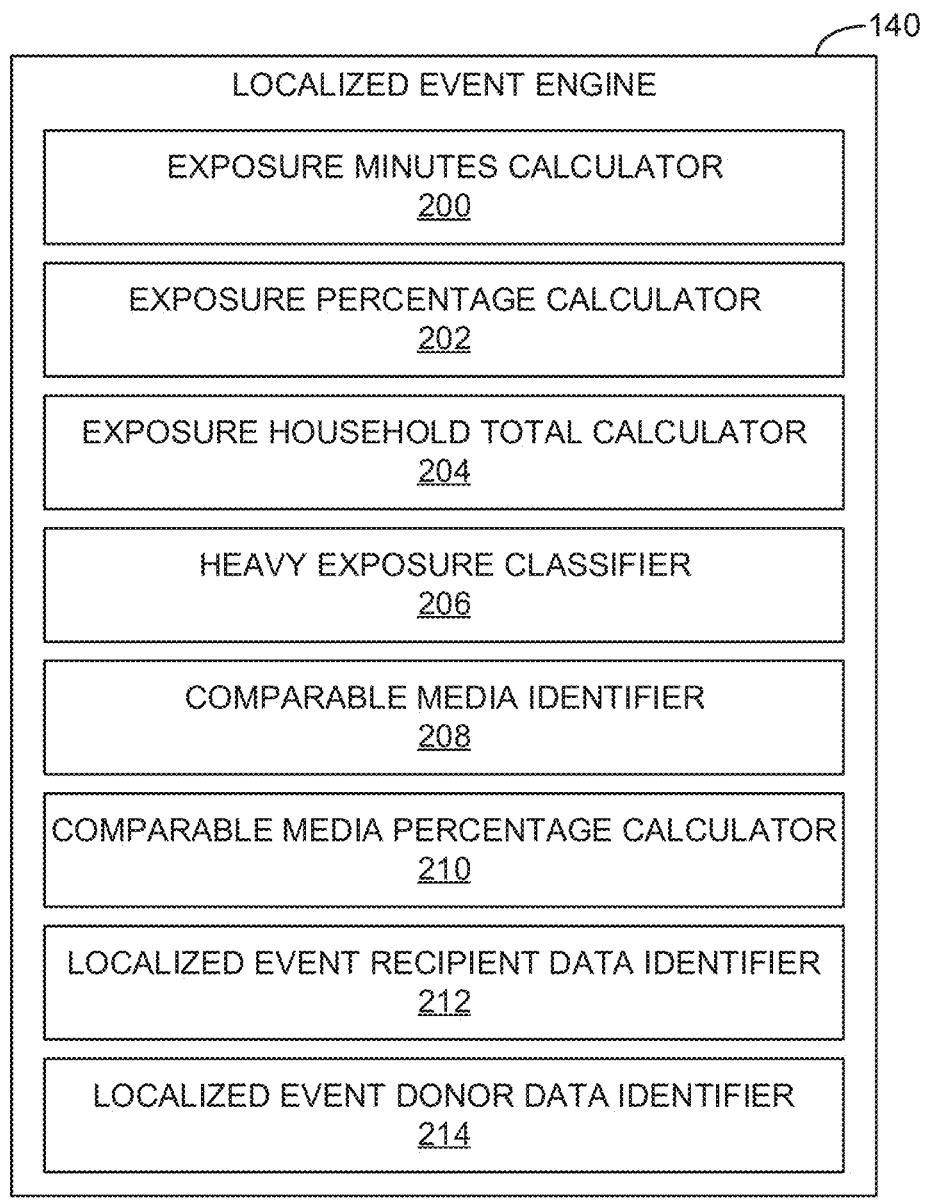
FIG. 2 is a block diagram of an example implementation of the example localized event engine of FIG. 1, which is structured to analyze panelist data for localized event media consumption behavior.

FIG. 2 is a block diagram of an example implementation of the localized event engine 140 of FIG. 1. The example localized event engine 140 determines if collected panelist data exhibits localized event media consumption behavior (e.g., media consumption behavior biased and/or influenced by a localized media event). The example localized event engine 140 of FIG. 2 includes an example exposure minutes calculator 200, an example exposure percentage calculator 202, an example exposure household total calculator 204, an example heavy exposure classifier 206, an example comparable media identifier 208, an example comparable media percentage calculator 210, an example localized event recipient data identifier 212 and an example localized event donor data identifier 214.

In the illustrated example of FIG. 2, the example localized event engine 140 includes the example exposure minutes calculator 200 to calculate a number of example exposure minutes (e.g., tuning minutes, viewing minutes, etc.) that a media station has been (or a plurality of media stations have been) accessed by panelists (e.g., tuning panelists, viewing panelists, etc.) in the example households 108,110,112,114 during an example time period (e.g., a quarter-hour, a day, a month, etc.). In some examples, the example exposure minutes calculator 200 filters the data obtained by the example collection engine 130 stored in the example database 136 based on characteristics such as time, media identifiers, station identifiers, etc. For example, the data collected by the learning household interface 132 and/or the tuning household interface 134 may be similar in that it includes a timestamp, a media identifier, a station identifier, etc. The data collected by the example learning household interface 132 may also include a panelist identifier corresponding to the panelist(s) who indicated they were exposed to the media via the PM device.

In the illustrated example, the example exposure minutes calculator 200 of FIG. 2 parses the filtered data and identifies data of interest (e.g., based on timestamps, media identifiers, station identifiers, etc.) to process. For example, the exposure minutes calculator 200 may filter tuning panelist data in the example database 136 for a specified time period (e.g., Monday 7:00-7:15 pm) based on an example station identifier (e.g., a station identifier "ESPN"). In the illustrated example, the example exposure minutes calculator 200 calculates a number of tuning minutes that the media station corresponding to the example station identifier (e.g., the station identifier "ESPN") was tuned to by tuning panelists in the first example tuning households 110 and/or the second example tuning households 114 during the specified time period (e.g., Monday 7:00-7:15 pm). In some examples, the example exposure minutes calculator 200 calculates a number of viewing minutes that the media station corresponding to the example station identifier (e.g., the station identifier "ESPN") was viewed by viewing panelists in the example learning households (e.g., first example learning households 108 and/or second example learning households 112) during the specified time period (e.g., Monday 7:00-7:15 pm). In some examples, the example exposure minutes calculator 200 calculates a total number of example exposure minutes (e.g., tuning minutes, viewing minutes, etc.) that media stations have been presented to panelists (e.g., tuning panelists, viewing panelists, etc.) in the example households 108,110,112,114 during an example time period (e.g., a quarter-hour, a day, a month, etc.).

In the illustrated example of FIG. 2, the example localized event engine 140 includes the example exposure percentage calculator 202 to calculate percentages corresponding to numbers of exposure minutes for media stations provided by the example exposure minutes calculator 200 with respect to a total number of exposure minutes for media stations provided by the exposure minutes calculator 200. For example, the exposure percentage calculator 202 may calculate a percentage of a number of tuning minutes for a media station with respect to the total number of tuning minutes for two or more media stations. In some examples, the two or more media stations may include the total number of media stations presented in a specified DMA. In some examples, the exposure percentage calculator 202 may calculate percentages corresponding to a number of viewing minutes for a media station with respect to the total number of viewing minutes for two or more media stations.

In the illustrated example of FIG. 2, the example localized event engine 140 includes the example exposure household total calculator 204 to determine a total number of example exposure households (e.g., tuning households, learning households, etc.) accessing media on media presentation devices. In some examples, the example exposure household total calculator 204 determines the total number of example exposure households (e.g., tuning households, learning households, etc.) associated with the outputs of the example exposure minutes calculator 200 and/or the example exposure percentage calculator 202. For example, the exposure household total calculator 204 may determine a total number of example tuning households (e.g., first example tuning households 110, second example tuning households 114, etc.) associated with the number of tuning minutes calculated by the example exposure minutes calculator 200 tuning to a specified media station and/or a specified media genre.

In some examples, the example exposure household total calculator 204 may determine a total number of example learning households associated with the number of viewing minutes calculated by the example exposure minutes calculator 200 viewing the specified media station and/or the specified media genre. Example exposure households may include, for example, qualified tuning households, qualified learning households, non-qualified tuning households, non-qualified learning households, etc. In some examples, the example exposure household total calculator 204 determines a tuning household subtotal, a learning household subtotal, a tuning household total, a learning household total, etc. based on including additional demographic dimensions and/or filtering parameters on the tuning household total and/or learning household total.

In the illustrated example of FIG. 2, the example localized event engine 140 includes the example heavy exposure classifier 206 to determine if panelist data (e.g., exposure data, tuning data, viewing data, etc.) collected by the example collection engine 130 classifies as "heavily exposed." The example heavy exposure classifier 206 processes data (e.g., iteratively processes data) for one or more media stations during a plurality of time periods (e.g., a plurality of quarter-hours for a plurality of dates). In the illustrated example of FIG. 2, the example heavy exposure classifier 206 classifies panelist data as "heavily exposed" when the panelist data satisfies two thresholds that may be indicative of exhibiting a localized event media consumption behavior. In some examples, the example heavy exposure classifier 206 uses at least one output from the example exposure percentage calculator 202 (e.g., the exposure percentage, the tuning percentage, the viewing percentage, etc.) and/or the example exposure household total calculator 204 (e.g., the exposure household total count, the tuning household total count, the learning household total count, etc.) to classify corresponding panelist data as heavily exposed data. In some examples, the example heavy exposure classifier 206 classifies collected viewing data as "heavily viewed" data and collected tuning data as "heavily tuned" data. As used herein, the terms "heavily viewed," and "heavily tuned" may be generally referred to as heavily exposed data. In the illustrated example of FIG. 2, when determining whether tuning data is heavily tuned data, the example heavy exposure classifier 206 determines if a tuning percentage associated with collected tuning data satisfies a "tuning percentage threshold." To determine if viewing data is heavily viewed data, the example heavy exposure classifier 206 of FIG. 2 determines if a viewing percentage associated with collected viewing data satisfies a "viewing percentage threshold." As used herein, the terms "tuning percentage threshold" and "viewing percentage threshold" may generally be referred to as exposure percentage thresholds.

In the illustrated example of FIG. 2, the example heavy exposure classifier 206 also determines if a number of households associated with the collected panelist data (e.g., exposure data, tuning data, viewing data, etc.) satisfies a household total count threshold. For example, the heavy exposure classifier 206 may determine if a number of tuning households associated with tuning data satisfies a "tuning household total count threshold" and/or if a number of learning households associated with viewing data satisfies a "learning household total count threshold." As used herein, the terms "tuning household total count threshold" and "learning household total count threshold" may generally be referred to as exposure household total count thresholds.

In the illustrated example of FIG. 2, the example heavy exposure classifier 206 classifies panelist data collected by the example collection engine 130 as heavily exposed by determining if the example exposure percentage threshold and the example exposure household total count threshold have been satisfied by the exposure percentage and the exposure household total count associated with the exposure data. For example, the heavy exposure classifier 206 may classify selected panelist data by the example collection engine 130 as heavily tuned data if (1) the tuning percentage associated with the panelist data satisfies the tuning percentage threshold and (2) the tuning household total count associated with the panelist data satisfies the tuning household total count threshold. Similarly, the example heavy exposure classifier 206 may classify selected panelist data by the example collection engine 130 as heavily viewed data if (1) the viewing percentage associated with the panelist data satisfies the viewing percentage threshold and (2) the learning household total count associated with the panelist data satisfies the learning household total count threshold.

In the illustrated example of FIG. 2, the example localized event engine 140 includes the example comparable media identifier 208 to analyze a heavily exposed time period (e.g., a quarter-hour associated with heavy exposure data) and identify media comparable to the media identified in the heavily exposed time period. For example, the comparable media identifier 208 may analyze media and/or a media station(s) associated with a heavily exposed time period (e.g., a quarter-hour classified by the example heavy exposure classifier 206 as heavily exposed) to identify a media identifier and/or station identifier associated with the heavily exposed media and/or a media station(s). In some examples, the example comparable media identifier 208 may compare the identified media identifier(s) and/or the station identifier(s) with media identifiers and/or station identifiers stored in the example database 136 to determine a potential match. The example comparable media identifier 208 may identify the potential matches in the example database 136 for the media identifier(s) and/or station identifier(s) in the heavily weighted quarter-hour(s) as comparable media. The example comparable media identifier 208 may store the associations and/or matches in the example database 136 for future querying by the example collection engine 130.

In the illustrated example of FIG. 2, the localized event engine 140 includes the example comparable media percentage calculator 210 to calculate percentages corresponding to a number of exposure minutes credited to comparable media with respect to a total number of exposure minutes for media stations. In some examples, the example comparable media percentage calculator 210 calculates percentages corresponding to comparable media identified by the example comparable media identifier 208. The example comparable media percentage calculator may then use the example exposure minutes calculator 200 to calculate a number of exposure minutes credited to the identified comparable media. For example, the comparable media percentage calculator 210 may calculate a percentage of a number of tuning minutes credited to the comparable media during an example time period (e.g., a quarter-hour, a day, a month, etc.) with respect to a total number of tuning minutes for a plurality of media stations (e.g., a "comparable media tuning percentage"). In some examples, the number of tuning minutes is credited to tuning panelists in the first example tuning households 110 and/or the second example tuning households 114. In some examples, the example comparable media percentage calculator 210 may calculate percentages corresponding to a number of viewing minutes credited to the comparable media during the example time period (e.g., the quarter-hour, the day, the month, etc.) with respect to a total number of viewing minutes for the plurality of media stations (e.g., a "comparable media viewing percentage"). In some examples, the example comparable media percentage calculator 210 credits the number of viewing minutes to viewing panelists in the first example learning households 108 and/or the second example learning households 112.

In the illustrated example of FIG. 2, the example localized event engine 140 includes the example localized event recipient data identifier 212 to determine if recipient data is influenced by an occurrence of a localized event. In the illustrated example, the localized event recipient data identifier 212 of FIG. 2, calculates a differential between (1) the comparable media tuning percentage calculated by the example comparable media percentage calculator 210, and (2) the example comparable media viewing percentage calculated by the example comparable media percentage calculator 210 (e.g., a "comparable media percentage differential"). To determine if the recipient data is influenced by a local event, the example localized event recipient data identifier 212 determines if the comparable media percentage differential satisfies an example comparable media percentage differential threshold (e.g., the comparable media percentage differential greater than or equal to 5 percent, etc.). In the illustrated example, in response to determining that the example comparable media percentage differential threshold is satisfied, the example localized event recipient data identifier 212 of FIG. 2 identifies the example recipient data as localized event recipient data, or LERC data. In some examples, the LERC data is a set of data exhibiting media consumption behavior influenced by an example bias (e.g., a local bias) due to an occurrence of a localized event.

In the illustrated example of FIG. 2, the example localized event engine 140 includes the example localized event donor data identifier 214 to identify donor data selected by the example collection engine 130 as exhibiting comparable media consumption behavior to the media consumption behavior associated with the LERC data. For example, the localized event donor data identifier 214 may identify donor data exhibiting a localized event media consumption behavior. In the illustrated example, the localized event donor data identifier 214 of FIG. 2 determines if the donor data satisfies (1) the viewing percentage threshold and (2) the learning household total count threshold to determine if the donor data is exhibiting localized event media consumption behavior. For example, the localized event donor data identifier 214 may determine if the viewing percentage associated with the donor data as calculated by the example exposure percentage calculator 202 satisfies the viewing percentage threshold. In some examples, the example localized event donor data identifier 214 determines if the learning household total count associated with the donor data as calculated by the example exposure household total calculator 204 satisfies the learning household total count threshold. In the illustrated example, if the example localized event donor data identifier 214 determines that the selected donor data satisfies (1) the viewing percentage threshold and (2) the learning household total count threshold, then the localized event donor data identifier 214 classifies the selected donor data as heavily viewed, or LEDC data.

While an example manner of implementing the example localized event engine 140 of FIG. 1 is illustrated in FIG. 2, one or more of the elements, processes and/or devices illustrated in FIG. 2 may be combined, divided, re-arranged, omitted, eliminated and/or implemented in any other way. Further, the example exposure minutes calculator 200, the example exposure percentage calculator 202, the example exposure household total calculator 204, the example heavy exposure classifier 206, the example comparable media identifier 208, the example comparable media percentage calculator 210, the example localized event recipient data identifier 212, the example localized event donor data identifier 214 and/or, more generally, the example localized event engine 140 of FIG. 2 may be implemented by hardware, software, firmware and/or any combination of hardware, software and/or firmware. Thus, for example, any of the example exposure minutes calculator 200, the example exposure percentage calculator 202, the example exposure household total calculator 204, the example heavy exposure classifier 206, the example comparable media identifier 208, the example comparable media percentage calculator 210, the example localized event recipient data identifier 212, the example localized event donor data identifier 214 and/or, more generally, the example localized event engine 140 of FIG. 2 may be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example exposure minutes calculator 200, the example exposure percentage calculator 202, the example exposure household total calculator 204, the example heavy exposure classifier 206, the example comparable media identifier 208, the example comparable media percentage calculator 210, the example localized event recipient data identifier 212, the example localized event donor data identifier 214 and/or, more generally, the example localized event engine 140 of FIG. 2 is hereby expressly defined to include a tangible computer readable storage device or storage disk such as a memory, a digital versatile disk (DVD), a compact disk (CD), a Blu-ray disk, etc. storing the software and/or firmware. Further still, the example localized event engine 140 of FIG. 2 may include one or more elements, processes and/or devices in addition to, or instead of, those illustrated in FIG. 2, and/or may include more than one of any or all of the illustrated elements, processes and devices.

Flowcharts representative of example machine-readable instructions for implementing the example viewer assignment engine 120 of FIG. 1 and/or the example localized event engine 140 are shown in FIGS. 3-10 and/or 11. In these examples, the machine-readable instructions comprise a program for execution by a processor such as the processor 1204 shown in the example processor platform 1202 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor 1204, but the entire program(s) and/or parts thereof may alternatively be executed by a device other than the processor 1204 and/or embodied in firmware or dedicated hardware. Further, although the example program(s) is/are described with reference to the flowcharts illustrated in FIGS. 3-11, many other methods of implementing the example viewer assignment engine 120 and/or the example localized event engine 140 may alternatively be used. For example, the order of execution of the blocks may be changed, and/or some of the blocks described may be changed, eliminated, or combined.

As mentioned above, the example processes of FIGS. 3-10 and/or 11 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine-readable storage medium" are used interchangeably. Additionally or alternatively, the example processes of FIGS. 3-10 and/or 11 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 3:
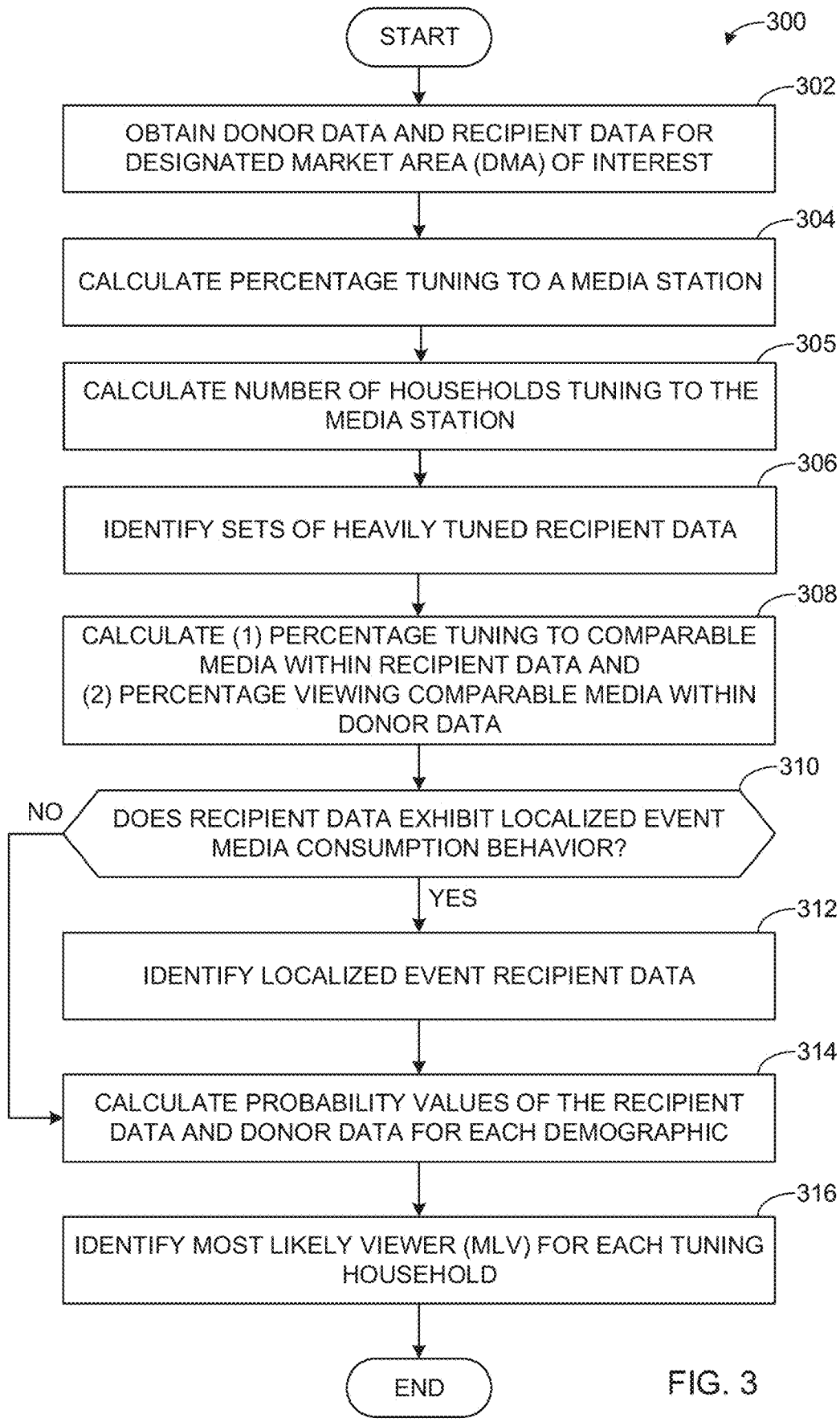
FIGS. 3-11 are flowcharts representative of example machine-readable instructions that may be executed by the example viewer assignment engine of FIG. 1 and/or the example localized event engine of FIGS. 1 and/or 2 to improve viewer assignment by adjusting for a localized event.

FIG. 3 is a flowchart representative of example machine-readable instructions 300 that may be executed by the example viewer assignment engine 120 of FIG. 1 to identify tuning panelists in one or more example tuning households (e.g., the first example tuning households 110) that are the most likely viewers for presented media. The example program 300 begins at block 302 when the example collection engine 130 (FIG. 1) collects panelist data for the example DMAs 102, 104. For example, the learning household interface 132 (FIG. 1) may obtain PM device data (e.g., viewing minutes) from the first example learning households 108 and/or the second example learning households 112. The example tuning household interface 134 (FIG. 1) may obtain MM device data (e.g., tuning minutes) from the first example viewing households 110 and/or the second example viewing households 114.

At block 304, the example localized event engine 140 (FIGS. 1 and/or 2) calculates a percentage tuning to a media station. For example, the exposure percentage calculator 202 (FIG. 2) may determine a percentage of a number of tuning households tuned to a particular media station with respect to the total number of tuning households. At block 305, the example localized event engine 140 determines a number of households tuning to the media station. For example, the exposure household total calculator (FIG. 2) may determine the number of households tuning to the media station. At block 306, the example localized event engine 140 identifies sets of heavily tuned recipient data. For example, the heavy exposure classifier 206 may identify a data set as a heavily tuned recipient data set when (1) the percentage tuning to the media station satisfies the tuning percentage threshold and (2) the number of households tuning to the media station satisfies the tuning household total count threshold.

At block 308, the example localized event engine 140 calculates (1) a percentage tuning to comparable media within recipient data and (2) a percentage viewing comparable media within donor data. For example, the comparable media percentage calculator 210 (FIG. 2) may calculate the comparable media tuning percentage and the comparable media viewing percentage associated with the data collected from the households 108,110,112,114. At block 310, the example localized event engine 140 determines whether the obtained recipient data exhibits localized event media consumption behavior. For example, the localized event recipient data identifier 212 (FIG. 2) may compare the comparable media tuning percentage to the comparable media viewing percentage. If, at block 310, the example localized event engine 140 determines that the recipient data does not exhibit localized event media consumption behavior (e.g., the comparable media percentage differential is less than 5 percent, etc.), control proceeds to block 314 to calculate one or more probability values that the panelists associated with PM device data and the panelists associated with MM device data are likely viewers of the presented media. If at block 310, the example localized event engine 140 determines that the obtained recipient data exhibits localized event media consumption behavior (e.g., the comparable media percentage differential is at least 5 percent, etc.), then, at block 312, the localized event engine 140 identifies the obtained recipient data as localized event recipient data. For example, the localized event recipient data identifier 212 may identify the obtained recipient data as either non-localized event recipient data or localized event recipient data.

At block 314, the example probability engine 160 (FIG. 1) calculates one or more probability values that the viewing panelists and the tuning panelists are likely viewers of the presented media. For example, the localized event probability calculator 162 (FIG. 1) may calculate localized event probabilities for LERC data and LEDC data identified as localized event data by the localized event recipient data identifier 212 (FIG. 2) and/or the localized event donor data identifier 214 (FIG. 2). The example non-localized event probability calculator 164 (FIG. 1) may calculate non-localized event probabilities for non-LERC data and non-LEDC data identified as non-localized event data by the example localized event recipient data identifier 212 and/or the example localized event donor data identifier 214.

At block 316, the example MLV engine 170 (FIG. 1) identifies a most likely viewer for each tuning panelist in the example tuning households 110 of FIG. 1. For example, the MLV engine 170 may match the media consumption behavior of each tuning panelist in the tuning household with a corresponding viewing panelist in a learning household. For example, the localized event MLV selector 172 (FIG. 1) may select the viewer panelist in the learning household exhibiting localized event media consumption behavior to match the tuning panelist in the tuning household exhibiting localized event media consumption behavior. The example non-localized event MLV selector 174 (FIG. 1) may select the viewer panelist in the learning household not exhibiting localized event media consumption behavior to match the tuning panelist in the tuning household not exhibiting localized event media consumption behavior. The example program 300 of FIG. 3 then ends.

Figure 4:
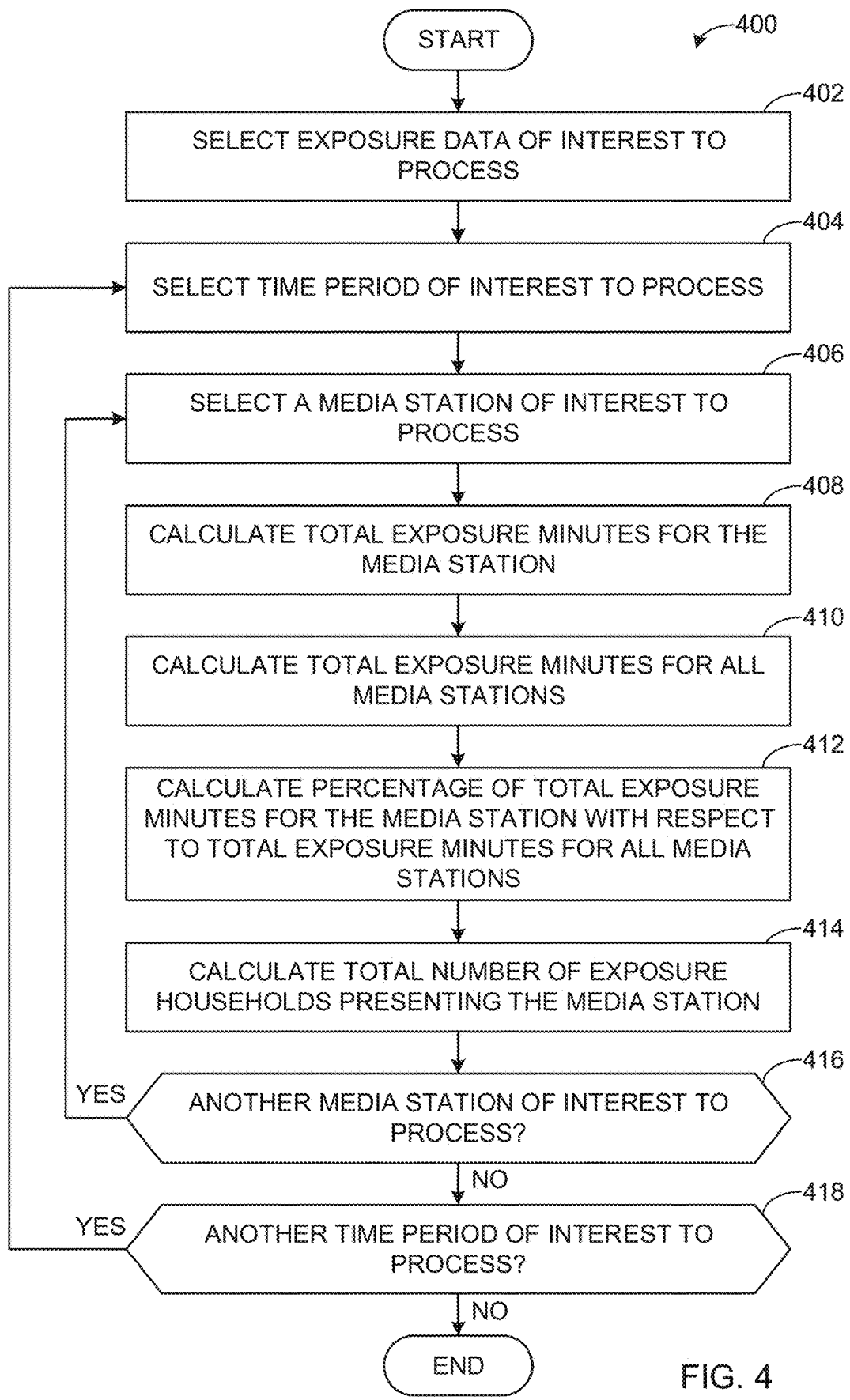

FIG. 4 is a flowchart representative of example machine-readable instructions 400 that may be executed by the example viewer assignment engine 120 of FIG. 1 to calculate the exposure percentage and to calculate the number of exposure households presenting a media station. The example program 400 of FIG. 4 begins at block 402 when the example collection engine 130 (FIG. 1) selects exposure data of interest to process. In some examples, the example collection engine 130 may select the exposure data of interest by collecting the exposure data from one or more applicable households. For example, the learning household interface 132 (FIG. 1) may select donor data from the learning households including PM devices. In some examples, the example tuning household interface 134 (FIG. 1) selects recipient data from the tuning households including MM devices. Additionally or alternatively, the example collection engine 130 may select exposure data of interest to process from the example database 136 (FIG. 1).

At block 404, the example collection engine 130 selects a time period of interest to process. For example, the collection engine 130 may select the time period Monday from 7-7:15 pm to process the exposure data of interest. At block 406, the example collection engine 130 selects a media station of interest to process.

At block 408, the example localized event engine 140 (FIGS. 1 and/or 2) calculates the total exposure minutes (e.g., tuning minutes, viewing minutes, etc.) for the selected media station during the selected time period. For example, the exposure minutes calculator 200 (FIG. 2) may calculate the total number of tuning minutes tuning to the selected media station during the selected time period. In some examples, the example exposure minutes calculator 200 calculates the total number of viewing minutes viewing the selected media station during the selected time period.

At block 410, the example localized event engine 140 calculates the total number of exposure minutes for a plurality of media stations during the selected time period. For example, the exposure minutes calculator 200 may calculate the total number of tuning minutes tuning to the plurality of media stations during the selected time period. In some examples, the example exposure minutes calculator 200 calculates the total number of viewing minutes viewing the plurality of media stations during the selected time period.

At block 412, the example localized event engine 140 calculates a percentage of total exposure minutes for the selected media station with respect to the total exposure minutes for the plurality of media stations during the selected time period. For example, the exposure percentage calculator 202 (FIG. 2) may calculate a percentage of the total number of tuning minutes for the selected media station with respect to the total number of tuning minutes for the plurality of media stations during the selected time period. In some examples, the exposure percentage calculator 202 calculates a percentage of the total number of viewing minutes for the selected media station with respect to the total number of viewing minutes for the plurality of media stations during the selected time period.

At block 414, the example localized event engine 140 calculates the total number of households presenting the selected media station during the selected time period. For example, the exposure household total calculator 204 (FIG. 2) may calculate the total number of tuning households tuning to the selected media station during the selected time period. In some examples, the example exposure household total calculator 204 calculates the total number of learning households viewing the selected media station during the selected time period.

At block 416, the example collection engine 130 determines if there is another media station of interest to process. If, at block 416, the example collection engine 130 determines that there is another media station of interest to process (e.g., the database 136 includes an unprocessed media station), control returns to block 406 to select another media station of interest to process. If, at block 416, the example collection engine 130 determines that there is not another media station of interest to process (e.g., the example database 136 returns a null index, etc.), then, at block 418, the collection engine 130 determines if there is another time period (e.g., quarter-hour, date, etc.) of interest to process. If, at block 418, the example collection engine 130 determines that there is another time period of interest to process (e.g., the database 136 includes an unprocessed time period), control returns to block 404 to select another time period of interest to process. If, at block 418, the example collection engine 130 determines that there is not another time period of interest to process (e.g., the example database 136 returns a null index, etc.), the example program 400 of FIG. 4 ends.

Figure 5:
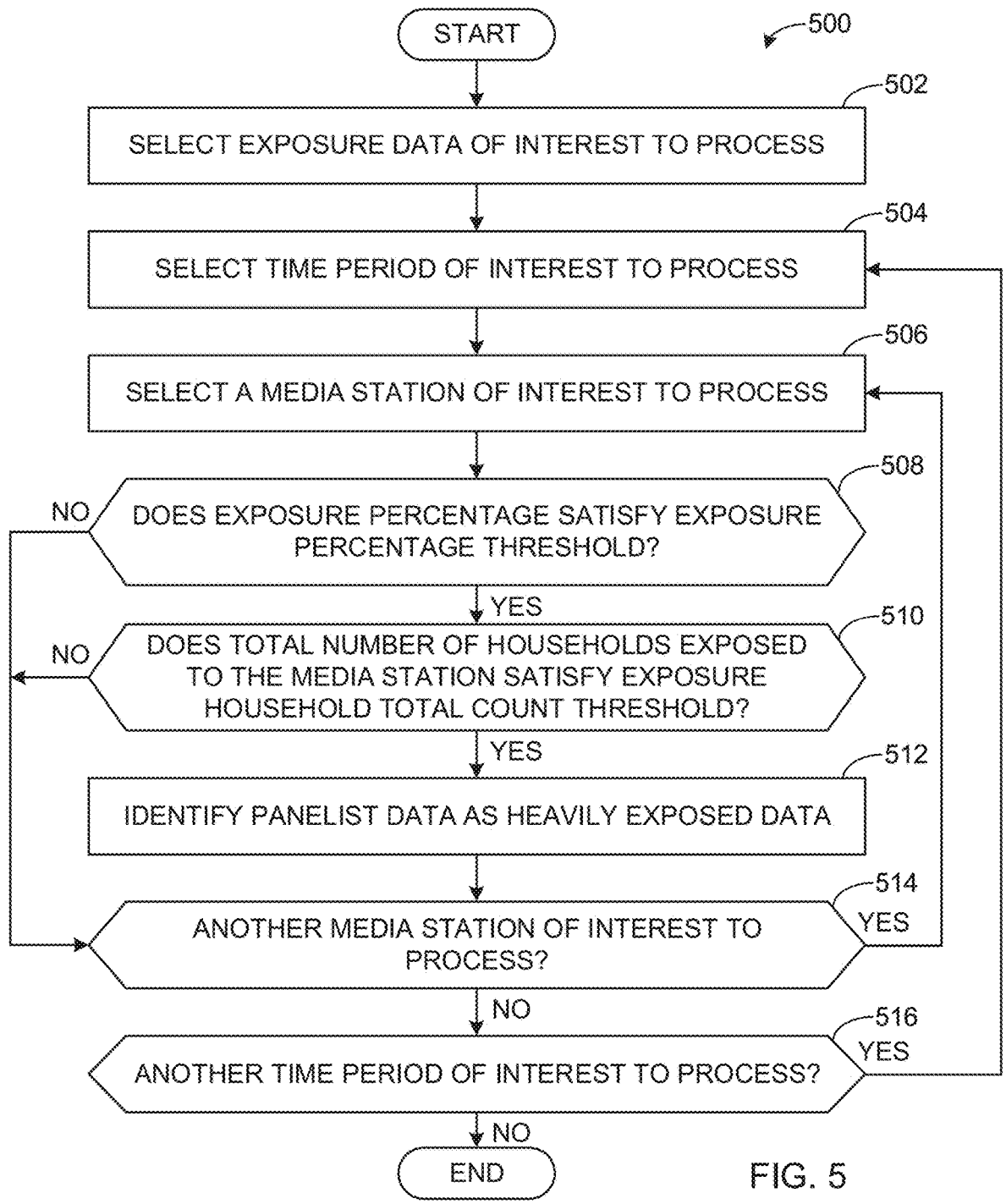

FIG. 5 is a flowchart representative of example machine-readable instructions 500 that may be executed by the example viewer assignment engine 120 of FIG. 1 to determine if obtained exposure data is heavily exposed. The example program 500 of FIG. 5 begins at block 502 when the example collection engine 130 (FIG. 1) selects exposure data (e.g., donor data, recipient data, etc.) of interest to process. In some examples, the example collection engine 130 may select the exposure data of interest by querying the exposure data from the example database 136 (FIG. 1) for processing. At block 504, the example collection engine 130 selects a time period of interest to process. For example, the collection engine 130 may select the time period Monday from 7-7:15 pm to process the exposure data of interest. At block 506, the example collection engine 130 selects a media station of interest to process.

At block 508, the example localized event engine 140 (FIGS. 1 and/or 2) determines whether the exposure percentage satisfies the exposure percentage threshold. For example, when processing tuning data, the heavy exposure classifier 206 (FIG. 2) may determine whether the tuning percentage associated with the selected media station satisfies the tuning percentage threshold. When processing viewing data, the example heavy exposure classifier 206 may determine whether the viewing percentage associated with the selected media station satisfies the viewing percentage threshold.

If, at block 508, the example localized event engine 140 determines that the exposure percentage does not satisfy the exposure percentage threshold (e.g., the percentage of exposure minutes to the media station is less than 20 percent, etc.), control proceeds to block 514 and the example collection engine 130 determines if there is another media station of interest to process.

If, at block 508, the example localized event engine 140 determines that the exposure percentage does satisfy the exposure percentage threshold (e.g., the percentage of exposure minutes to the media stations is greater than or equal to 20 percent, etc.), then, at block 510, the localized event engine 140 determines whether the total number of households exposed to the media station satisfies the exposure household total count threshold. For example, when processing tuning data, the heavy exposure classifier 206 may determine whether the total number of tuning households tuning to the selected media station satisfies the tuning household total count threshold. When processing viewing data, the example heavy exposure classifier 206 may determine whether the total number of learning households viewing the selected media station satisfies the learning household total count threshold.

If, at block 510, the example localized event engine 140 determines that the total number of households exposed to the media station does not satisfy the exposure household count threshold (e.g., the total number of households exposed to the selected media station is less than 60 households, etc.), control proceeds to block 514 and the example collection engine 130 determines if there is another media station of interest to process. If, at block 510, the example localized event engine 140 determines that the total number of exposure households exposed to the selected media station does satisfy the exposure household count threshold (e.g., the total number of households exposed to the selected media station is at least 60 households, etc.), then, at block 512, the localized event engine 140 identifies the selected exposure data as heavily exposed data. For example, when processing tuning data, the heavy exposure classifier 206 may identify the selected recipient data as heavily tuned data. When processing viewing data, the example heavy exposure classifier 206 may identify the selected donor data as heavily viewed data.

At block 514, the example collection engine 130 determines whether there is another media station of interest to process. For example, the collection engine 130 may query the database 136 to determine if there is another media station of interest to process. If, at block 514, the example collection engine 130 determines that there is another media station of interest to process (e.g., the database 136 includes an unprocessed media station), control returns to block 506 and the collection engine 130 selects another media station of interest to process.

If, at block 514, the example collection engine 130 determines that there is not another media station of interest to process (e.g., the database 136 returns a null index, etc.), then, at block 516, the collection engine 130 determines whether there is another time period of interest to process. If, at block 516, the example collection engine 130 determines that there is another time period of interest to process (e.g., the database 136 includes an unprocessed time period), control returns to block 504 to select another time period of interest to process. If, at block 516, the example collection engine 130 determines that there is not another time period of interest to process (e.g., the database 136 returns a null index, etc.), the example program 500 of FIG. 5 ends.

Figure 6:
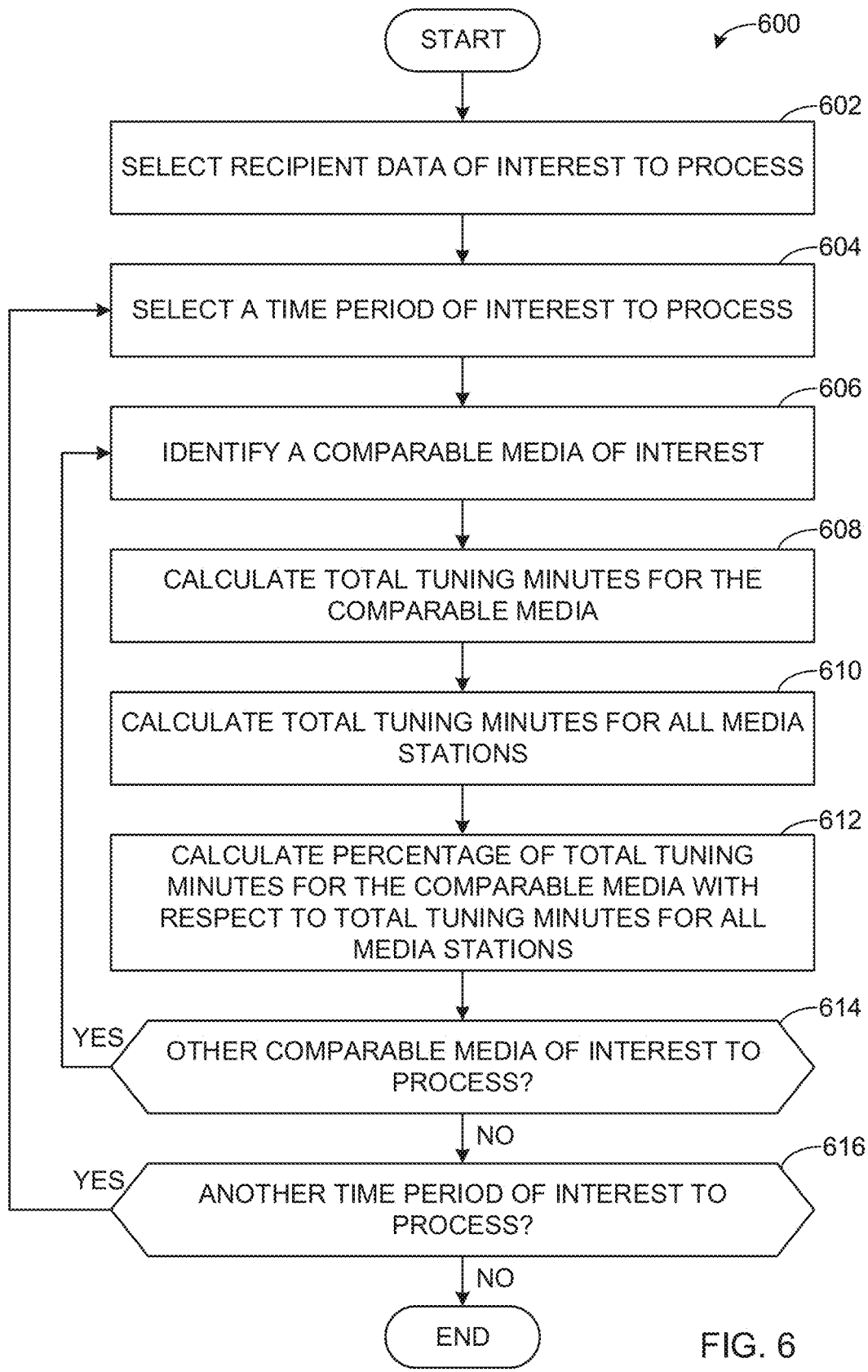

FIG. 6 is a flowchart representative of example machine-readable instructions 600 that may be executed by the example viewer assignment engine 120 of FIG. 1 to calculate an example comparable media tuning percentage. The example program 600 of FIG. 6 begins at block 602 when the example collection engine 130 (FIG. 1) selects recipient data of interest to process. In some examples, the example collection engine 130 may select the recipient data of interest by querying the recipient data from the example database 136 (FIG. 1) for processing.

At block 604, the example collection engine 130 selects a time period of interest to process. For example, the collection engine 130 may select the time period Monday from 7:00-7:15 pm to process the selected recipient data. At block 606, the example localized event engine 140 (FIGS. 1 and/or 2) identifies media comparable to the media identified in the selected recipient data. For example, the comparable media identifier 208 (FIG. 2) may identify a comparable media station of interest and/or a comparable media genre of interest to a media station and/or media genre identified in the selected recipient data.

At block 608, the example localized event engine 140 calculates the total number of tuning minutes for the identified comparable media. For example, the exposure minutes calculator 200 (FIG. 2) may sum the tuning minutes associated with the comparable media. At block 610, the example localized event engine 140 calculates the total number of tuning minutes for a plurality of media stations. For example, the exposure minutes calculator 200 may sum the total number of tuning minutes associated with the plurality of media stations.

At block 612, the example localized event engine 140 calculates a percentage of the total number of tuning minutes for the comparable media with respect to the total number of tuning minutes for the plurality of media stations (e.g., a comparable media tuning percentage). For example, the comparable media percentage calculator 210 (FIG. 2) may calculate the comparable media tuning percentage. At block 614, the example collection engine 130 determines whether there is other comparable media of interest to process. For example, the collection engine 130 may query the database 136 to determine if there is other comparable media association and/or comparable media match that the localized event engine 140 may process. If, at block 614, the example collection engine 130 determines that there is other comparable media of interest to process (e.g., the database 136 includes an unprocessed comparable media association and/or comparable media match), control returns to block 606 and the collection engine 130 selects other comparable media of interest to process. If, at block 614, the example collection engine 130 determines that there is not other comparable media of interest to process (e.g., the database 136 returns a null index, etc.), then, at block 616, the collection engine 130 determines whether there is another time period of interest to process. If, at block 616, the example collection engine 130 determines that there is another time period of interest to process (e.g., the database 136 includes an unprocessed time period), control returns to block 604 and the collection engine 130 selects another time period of interest to process. If, at block 616, the example collection engine 130 determines that there is not another time period of interest to process (e.g., the database 136 returns a null index, etc.), the example program 600 of FIG. 6 ends.

Figure 7:
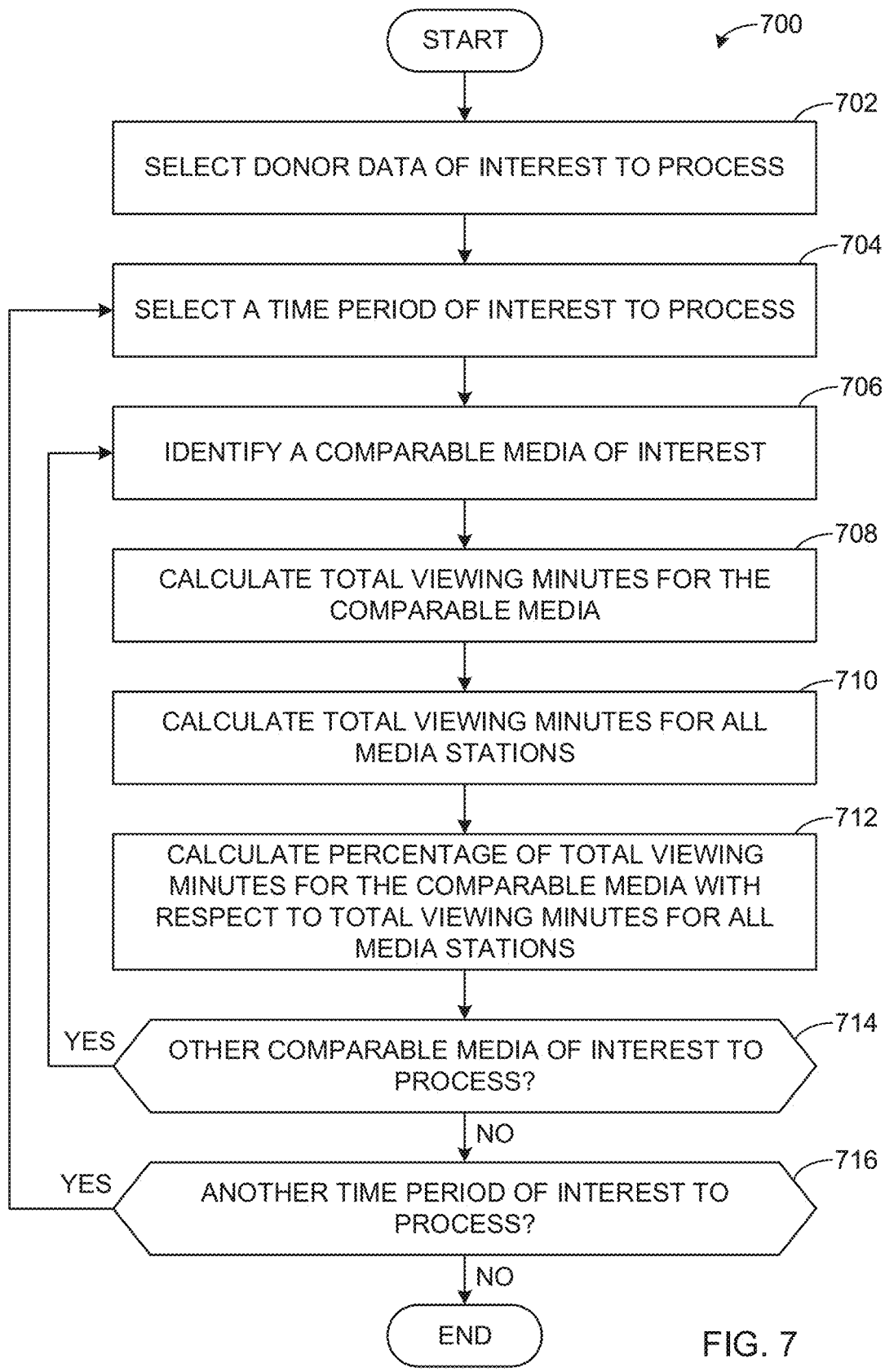

FIG. 7 is a flowchart representative of example machine-readable instructions 700 that may be executed by the example viewer assignment engine 120 of FIG. 1 to calculate an example comparable media viewing percentage. The example program 700 of FIG. 7 begins at block 702 when the example collection engine 130 (FIG. 1) selects donor data of interest to process. In some examples, the example collection engine 130 may select the donor data of interest by querying the donor data from the example database 136 (FIG. 1) for processing. At block 704, the example collection engine 130 selects a time period of interest to process. For example, the collection engine 130 may select the time period Monday from 7:00-7:15 pm to process the selected donor data.

At block 706, the example localized event engine 140 (FIGS. 1 and/or 2) identifies media comparable to the media identified in selected donor data. For example, the comparable media identifier 208 (FIG. 2) may identify a comparable media station of interest and/or a comparable media genre of interest to a media station and/or media genre identified in the selected donor data.

At block 708, the example localized event engine 140 calculates the total number of viewing minutes for the identified comparable media. For example, the exposure minutes calculator 200 (FIG. 2) may sum the viewing minutes associated with the comparable media. At block 710, the example localized event engine 140 calculates the total number of viewing minutes for a plurality of media stations. For example, the exposure minutes calculator 200 may sum the total number of viewing minutes associated with the plurality of media stations. At block 712, the example localized event engine 140 calculates a percentage of the total number of viewing minutes for the comparable media with respect to the total number of viewing minutes for the plurality of media stations (e.g., a comparable media viewing percentage). For example, the comparable media percentage calculator 210 (FIG. 2) may calculate the comparable media viewing percentage.

At block 714, the example collection engine 130 determines whether there is other comparable media of interest to process. For example, the collection engine 130 may query the database 136 to determine if there is other comparable media association and/or comparable media match that the localized event engine 140 may process. If, at block 714, the example collection engine 130 determines that there is other comparable media of interest to process (e.g., the database 136 includes an unprocessed comparable media association and/or comparable media match), control returns to block 706 and the collection engine 130 selects other comparable media of interest to process.

If, at block 714, the example collection engine 130 determines that there is not other comparable media of interest to process (e.g., the database 136 returns a null index, etc.), then, at block 716, the collection engine 130 determines whether there is another time period of interest to process. If, at block 716, the example collection engine 130 determines that there is another time period of interest to process (e.g., the database 136 includes an unprocessed time period), control returns to block 704 and the collection engine 130 selects another time period of interest to process. If, at block 716, the example collection engine 130 determines that there is not another time period of interest to process (e.g., the database 136 returns a null index, etc.), the example program 700 of FIG. 7 ends.

Figure 8:
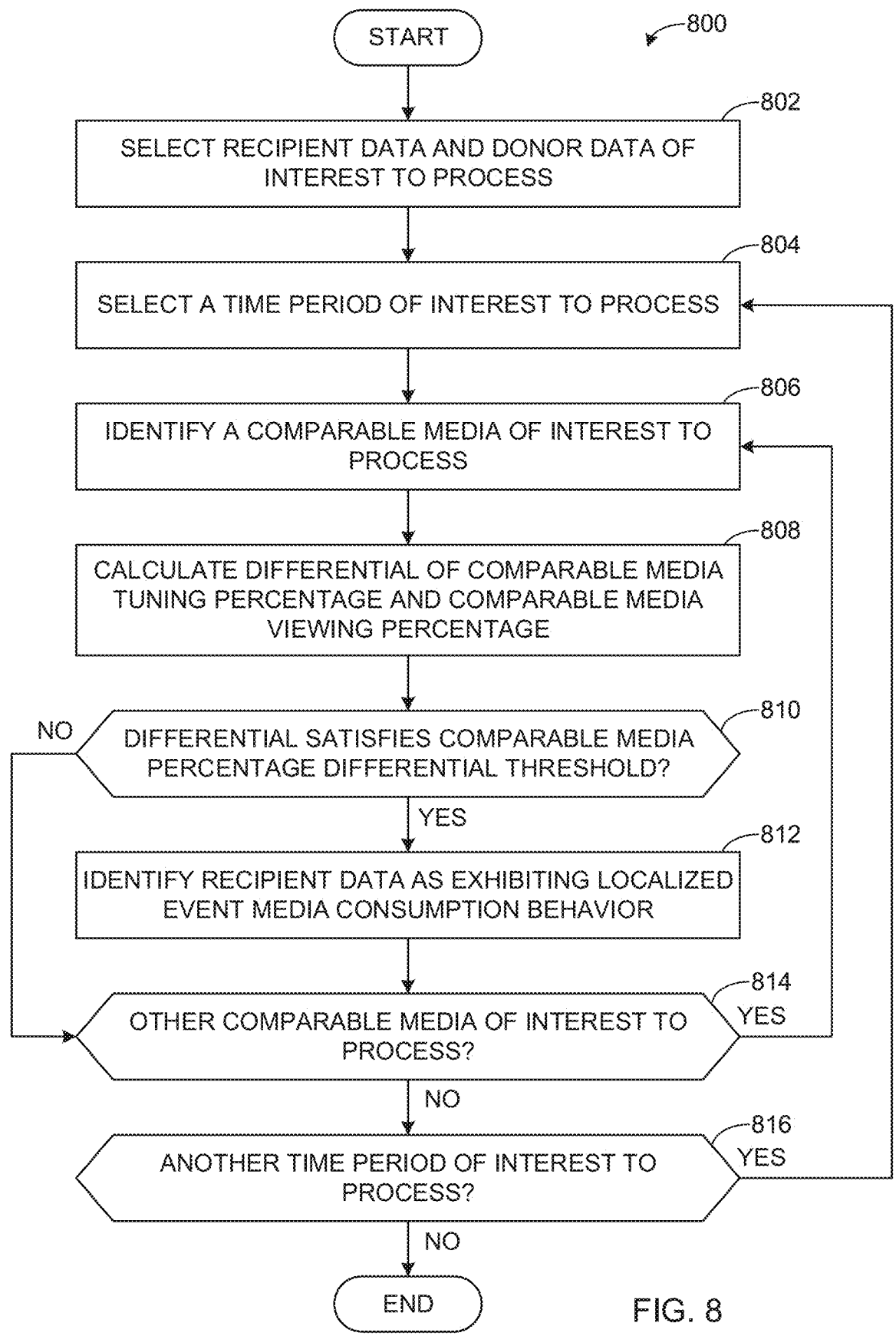

FIG. 8 is a flowchart representative of example machine-readable instructions 800 that may be executed by the example viewer assignment engine 120 of FIG. 1 to identify localized event data. The example program 800 begins at block 802 when the example collection engine 130 (FIG. 1) selects recipient data and donor data of interest to process. For example, the collection engine 130 may select recipient data that is classified as heavily exposed and/or heavily tuned. In some examples, the example collection engine 130 may select the recipient data and donor data of interest by querying the recipient data donor data from the example database 136 (FIG. 1) for processing. At block 804, the example collection engine 130 selects a time period of interest to process. For example, the collection engine 130 may select the time period Monday from 7:00-7:15 pm to process the selected recipient data and donor data of interest.

At block 806, the example localized event engine 140 identifies a comparable media of interest to process. For example, the comparable media identifier 208 (FIG. 2) may identify a comparable media station and/or a comparable media genre to the media identified in the selected recipient data and donor data to process. At block 808, the example localized event engine 140 calculates a differential between the comparable media tuning percentage and the comparable media viewing percentage (e.g., comparable media percentage differential). For example, the localized event recipient data identifier 212 (FIG. 2) may calculate the comparable media percentage differential.

At block 810, the example localized event engine 140 determines whether the comparable media percentage differential satisfies the comparable media percentage differential threshold (e.g., the comparable media percentage differential is at least 5 percent, etc.). For example, the localized event recipient data identifier 212 may determine whether the comparable media percentage differential satisfies the comparable media percentage differential threshold. If, at block 810, the example localized event engine 140 determines that the comparable media percentage differential does not satisfy the comparable media percentage differential threshold (e.g., the comparable media percentage differential is less than 5 percent, etc.), control proceeds to block 814 to determine if there is other comparable media of interest to process. If at block 810, the example localized event engine 140 determines that the comparable media percentage differential satisfies the comparable media percentage differential threshold (e.g., the comparable media percentage differential is at least 5 percent, etc.), then, at block 812, the localized event engine 140 identifies the selected recipient data as exhibiting localized event media consumption behavior. For example, the localized event recipient data identifier 212 may identify the selected recipient data as LERC data.

At block 814, the example collection engine 130 determines whether there is other comparable media of interest to process. For example, the collection engine 130 may query the database 136 to determine if there is other comparable media association and/or comparable media match that the localized event engine 140 may process. If, at block 814, the example collection engine 130 determines that there is other comparable media of interest to process (e.g., the database 136 includes an unprocessed comparable media association and/or comparable media match), control returns to block 806 and the collection engine 130 selects other comparable media of interest to process. If, at block 814, the example collection engine 130 determines that there is not other comparable media of interest to process (e.g., the database 136 returns a null index, etc.), then, at block 816, the collection engine 130 determines whether there is another time period of interest to process. If, at block 816, the example collection engine 130 determines that there is another time period of interest to process (e.g., the database 136 includes an unprocessed time period), control returns to block 804 and the collection engine 130 selects another time period of interest to process. If, at block 816, the example collection engine 130 determines that there is not another time period of interest to process (e.g., the database 136 returns a null index, etc.), the example program 800 of FIG. 8 ends.

Figure 9:
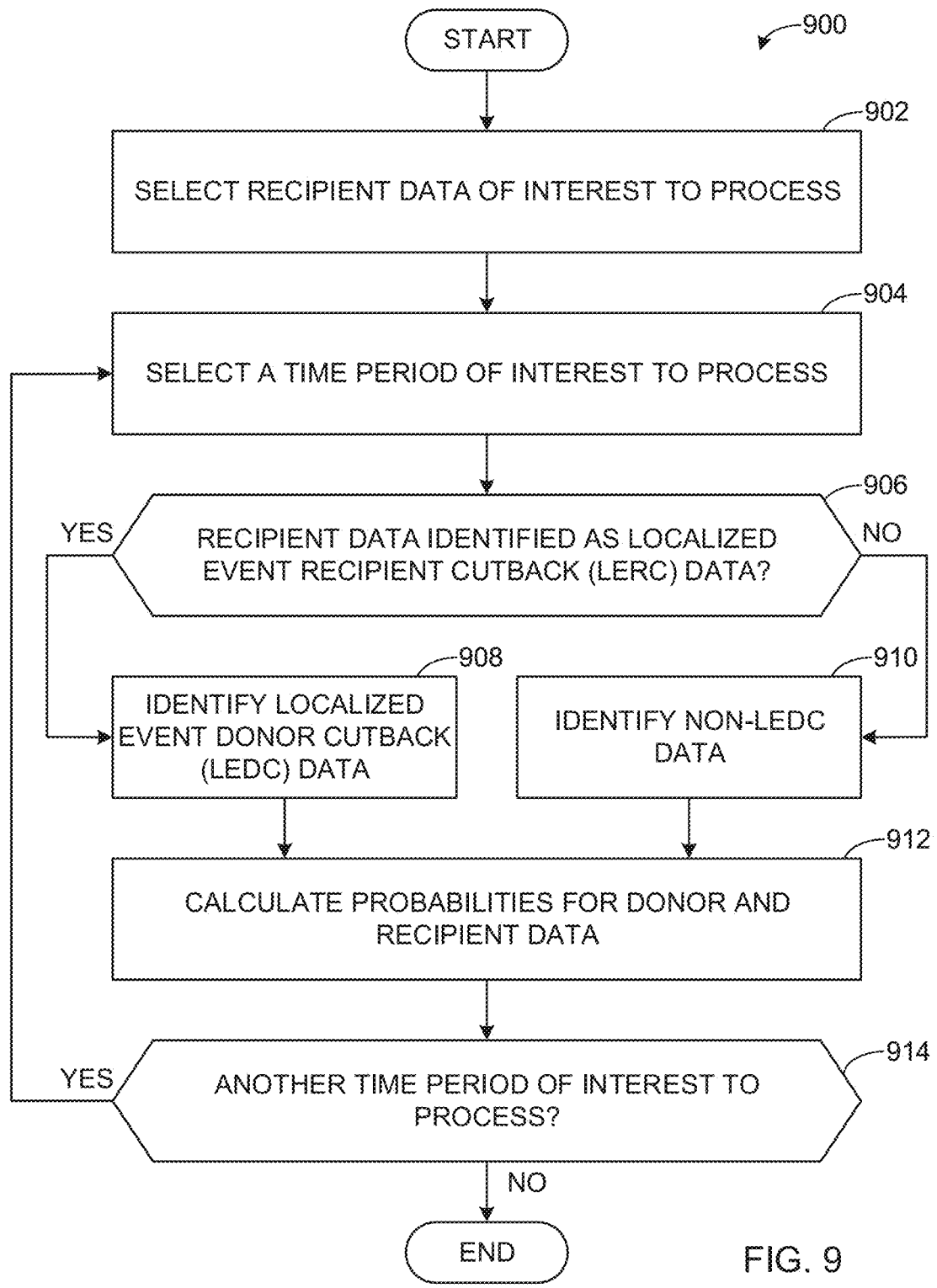

FIG. 9 is a flowchart representative of example machine-readable instructions 900 that may be executed by the example viewer assignment engine 120 of FIG. 1 to calculate imputation probabilities for recipient data and donor data for demographic groups. The example program 900 of FIG. 9 begins at block 902 when the example collection engine 130 (FIG. 1) selects recipient data of interest to process. For example, the collection engine 130 may select recipient data that is classified as heavily exposed and/or heavily tuned from the database 136 (FIG. 1). At block 904, the example collection engine 130 selects a time period of interest to process. For example, the collection engine 130 may select the time period Monday from 7:00-7:15 pm to process the selected recipient data of interest. At block 906, the example localized event engine 140 determines whether the selected recipient data is identified as LERC data. For example, the localized event recipient data identifier 212 (FIG. 2) may determine whether the selected recipient data is identified as LERC data.

If, at block 906, the example localized event engine 140 determines that the selected recipient data is identified as LERC data, then, at block 908, the example localized event engine 140 identifies LEDC data. For example, the localized event donor data identifier 214 (FIG. 2) may identify LEDC data by determining if the viewer percentage and the learning household total count satisfies the viewer percentage threshold and the learning household total count threshold. If, at block 906, the example localized event engine 140 determines that the selected recipient data is not LERC data (e.g., non-LERC data), then, at block 910, the example localized event engine 140 identifies non-LEDC data. For example, the collection engine 130 may identify non-LEDC data.

At block 912, the example probability engine 160 (FIG. 1) calculates probabilities for the LERC data and the LEDC data or the non-LERC data and the non-LEDC data. For example, when processing localized event cutback data, the example localized event probability calculator 162 (FIG. 1) calculates probabilities for the LERC data and the LEDC data. When processing non-localized event cutback data, the example non-localized event probability calculator 164 (FIG. 1) calculates probabilities for the non-LERC data and the non-LEDC data.

At block 914, the example collection engine 130 determines whether there is another time period of interest to process. If, at block 914, the example collection engine 130 determines that there is another time period of interest to process (e.g., the database 136 includes an unprocessed time period), control returns to block 904 and the collection engine 130 selects another time period of interest to process. If, at block 914, the example collection engine 130 determines that there is not another time period of interest to process (e.g., the database 136 returns a null index, etc.), the example program 900 of FIG. 9 ends.

Figure 10:
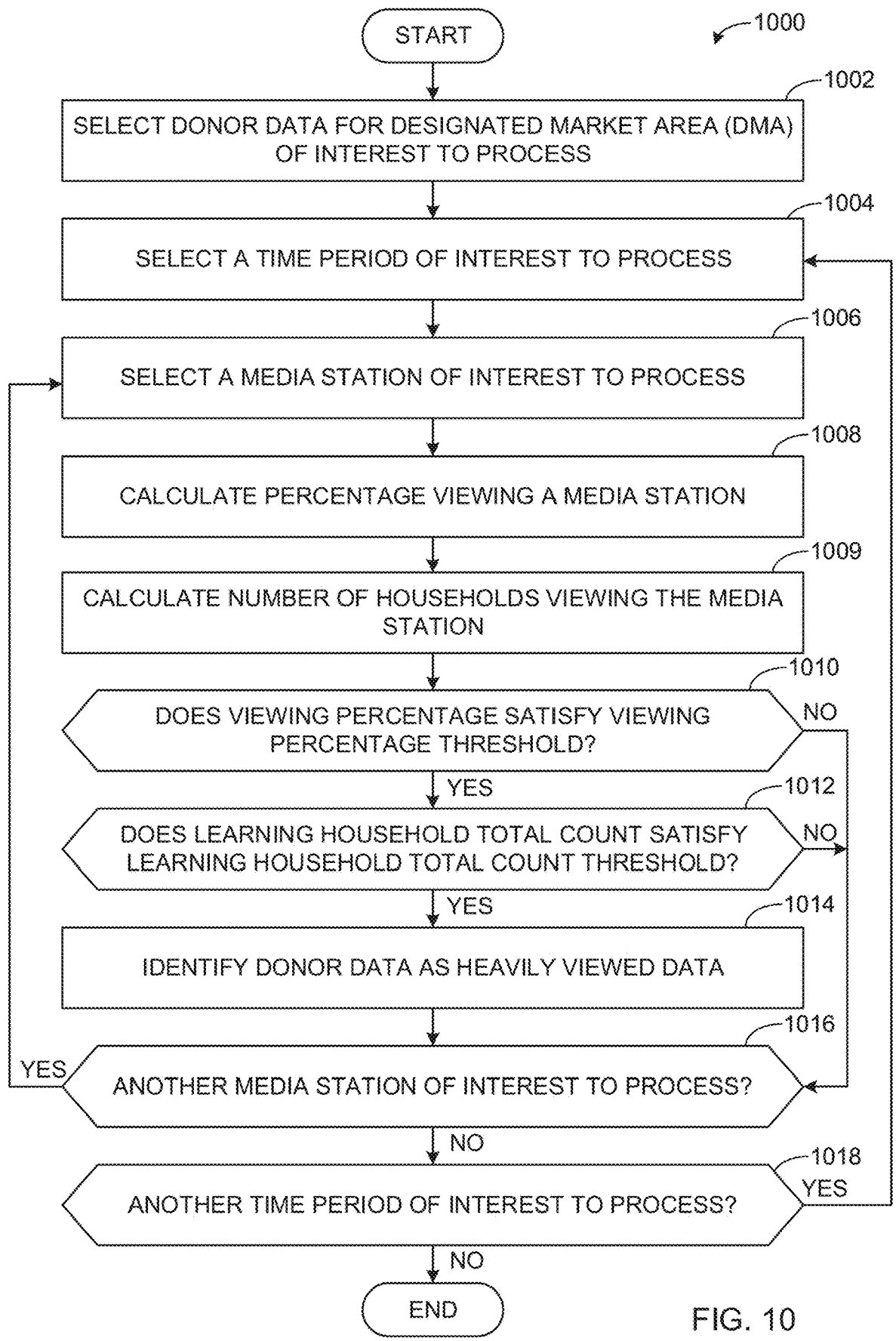

FIG. 10 is a flowchart representative of example machine-readable instructions 1000 that may be executed by the example viewer assignment engine 120 of FIG. 1 to identify LEDC data that matches at least one demographic and/or dimension of the LERC data of interest. The example program 1000 of FIG. 10 begins at block 1002 when the example collection engine 130 (FIG. 1) selects donor data for a DMA of interest to process. For example, the collection engine 130 may select donor data associated with the DMA of interest from the example database 136 (FIG. 1). At block 1004, the example collection engine 130 selects a time period of interest to process. For example, the collection engine 130 may select the time period Monday from 7:00-7:15 pm to process. At block 1006, the example collection engine 130 selects a media station of interest to process. For example, the collection engine 130 may query the database 136 for the media station of interest to process for the selected time period. At block 1008, the example localized event engine 140 calculates a percentage viewing the media station (e.g., a viewing percentage). For example, the exposure percentage calculator 202 (FIG. 2) may calculate the viewing percentage. At block 1009, the example localized event engine 140 calculates a number of households viewing the media station (e.g., a learning household total count). For example, the exposure household total calculator 204 (FIG. 2) calculates the learning household total count.

At block 1010, the example localized event engine 140 determines whether the viewing percentage satisfies a viewing percentage threshold. For example, the heavy exposure classifier 206 (FIG. 2) may determine whether the viewing percentage satisfies the viewing percentage threshold. If, at block 1010, the example localized event engine 140 determines that the viewing percentage does not satisfy the viewing percentage threshold (e.g., the viewing percentage is less than 20 percent, etc.), control proceeds to block 1016 to determine if there is another media station of interest to process. If, at block 1010, the example localized event engine 140 determines the viewing percentage satisfies the viewing percentage threshold (e.g., the viewing percentage is at least 20 percent, etc.), then, at block 1012, the localized event engine 140 determines whether the learning household total count satisfies the learning household total count threshold. For example, the heavy exposure classifier 206 may determine whether the learning household total count satisfies the learning household total count threshold.

If, at block 1012, the example localized event engine 140 determines that the learning household total count does not satisfy the learning household total count threshold (e.g., the learning household total count is less than 60 households, etc.), control proceeds to block 1016 to determine whether there is another media station of interest to process. If, at block 1012, the example localized event engine 140 determines that the learning household total count satisfies the learning household total count threshold (e.g., the learning households total count is at least 60 households, etc.), then, at block 1014, the localized event engine 140 identifies the selected donor data as heavily viewed data. For example, the localized event donor data identifier 214 (FIG. 2) may identify the selected donor data as LEDC data.

At block 1016, the example collection engine 130 determines whether there is another media station of interest to process. If, at block 1016, the example collection engine 130 determines that there is another media station of interest to process (e.g., the database 136 includes an unprocessed media station), control returns to block 1006 and the collection engine 130 selects another media station of interest to process. If, at block 1016, the example collection engine 130 determines that there is not another media station of interest to process (e.g., the database 136 returns a null index, etc.), then, at block 1018, the collection engine 130 determines whether there is another time period of interest to process.

If, at block 1018, the example collection engine 130 determines that there is another time period of interest to process (e.g., the database 136 includes an unprocessed time period), control returns to block 1004 and the collection engine 130 selects another time period of interest to process. If, at block 1018, the example collection engine 130 determines that there is not another time period of interest to process (e.g., the database 136 returns a null index, etc.), the example program 1000 of FIG. 10 ends.

Figure 11:
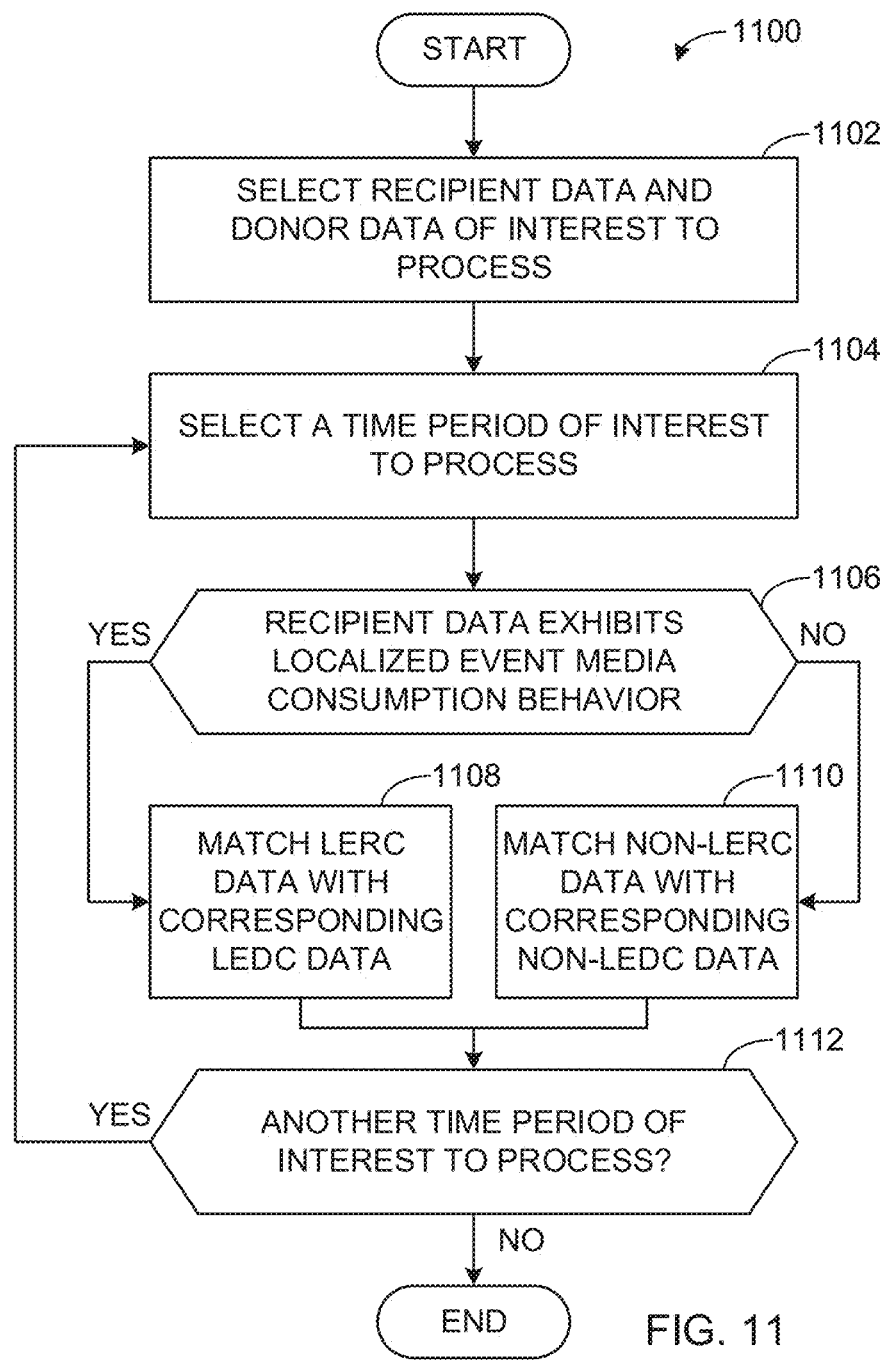

FIG. 11 is a flowchart representative of example machine-readable instructions 1100 that may be executed by the example viewer assignment engine 120 of FIG. 1 to identify the most likely viewer for the presented media for each tuning household. The example program 1100 of FIG. 11 begins at block 1102 when the example collection engine 130 (FIG. 1) selects recipient data of interest and donor data of interest to process. For example, the collection engine 130 may select recipient data that is classified as heavily exposed and/or heavily tuned from the database 136 (FIG. 1). At block 1104, the example collection engine 130 selects a time period of interest to process. For example, the collection engine 130 may select the time period Monday from 7:00-7:15 pm to process the selected recipient data and donor data.

At block 1106, the example localized event engine 140 determines whether the selected recipient data exhibits localized event media consumption behavior. For example, the localized event recipient data identifier 212 (FIG. 2) may evaluate a flag and/or a variable in the database 136 associated with the selected recipient data to determine that the selected recipient data is identified as LERC data.

If, at block 1106, the example localized event engine 140 determines that the selected recipient data exhibits localized event media consumption behavior, then, at block 1108, the example MLV engine 170 (FIG. 1) matches the LERC data with corresponding LEDC data. In some examples, the localized event MLV selector 172 (FIG. 1) matches the LERC data with the corresponding LEDC data. For example, the localized event MLV selector 172 may impute a media consumption behavior of a tuning panelist in a first example tuning household 110 for a media consumption behavior of a viewing panelist in a first example learning household 108 or a second example learning household 112. If, at block 1106, the example localized event engine 140 determines that the selected recipient data does not exhibit localized event media consumption behavior, then, at block 1110, the example MLV engine 170 matches non-LERC data with corresponding non-LEDC data. In some examples, the non-localized event MLV selector 174 (FIG. 1) matches the non-LERC data with the corresponding non-LEDC data. For example, the non-localized event MLV selector 174 may impute a media consumption behavior of a tuning panelist in a first example tuning household 112 for a media consumption behavior of a viewing panelist in a first example learning household 108 or a second example learning household 112.

At block 1112, the example collection engine 130 determines whether there is another time period of interest to process. If, at block 1112, the example collection engine 130 determines there is another time period of interest to process (e.g., the database 136 includes an unprocessed time period), control returns to block 1104 to select another time period of interest to process. If, at block 1112, the example collection engine 130 determines that there is not another time period of interest to process (e.g., the database 136 returns a null index, etc.), the example program 1100 of FIG. 11 ends.

Figure 12:
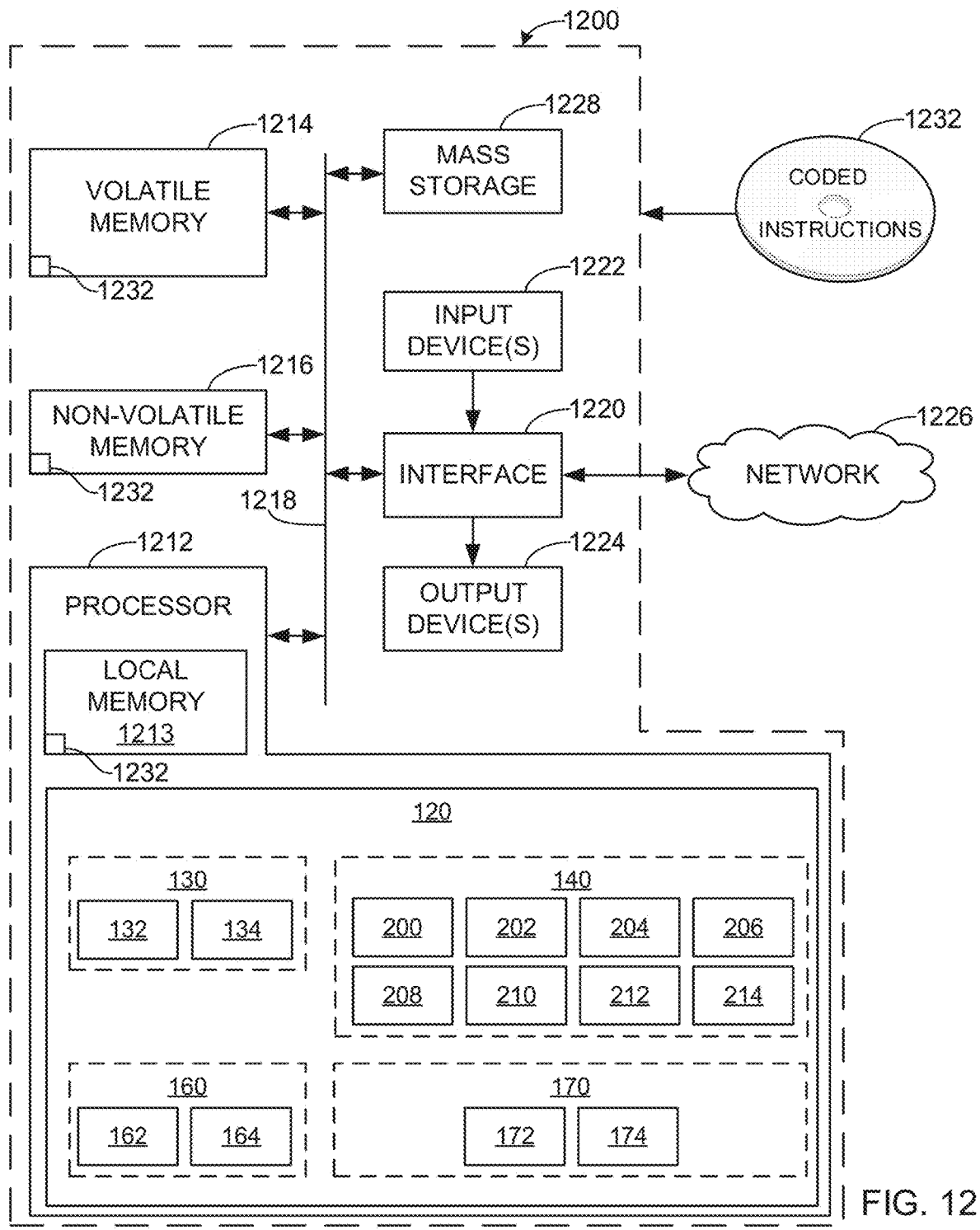
FIG. 12 is a block diagram of an example processor platform structured to execute the machine-readable instructions of FIGS. 3-11 to implement the example viewer assignment engine of FIG. 1 and/or the example localized event engine of FIGS. 1 and/or 2.

FIG. 12 is a block diagram of an example processor platform 1200 capable of executing the instructions of FIGS. 3-10 and/or 11 to implement the viewer assignment engine 120 of FIG. 1 and/or the example localized event engine 140 of FIGS. 1 and/or 2. The processor platform 1200 can be, for example, a server, a personal computer, an Internet appliance, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example executes the instructions to implement the example viewer assignment engine 120, the example collection engine 130, the example learning household interface 132, the example tuning household interface 134, the example localized event engine 140, the example probability engine 160, the example localized event probability calculator 162, the example non-localized event probability calculator 164, the example MLV engine 170, the example localized event MLV selector 172, the example non-localized event MLV selector 174, the example exposure minutes calculator 200, the example exposure percentage calculator 202, the example exposure household total calculator 204, the example heavy exposure classifier 206, the example comparable media identifier 208, the example comparable media percentage calculator 210, the example localized event recipient data identifier 212 and the example localized event donor data identifier 214. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. The example mass storage 1228 implements the example database 136.

The coded instructions 1232 of FIGS. 3-10 and/or 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture facilitate improving viewer assignment by adjusting for a local bias during localized events. The above disclosed localized event engine uses a heavy exposure classifier to determine that the selected recipient data is heavily exposed when (1) a tuning percentage satisfies a tuning percentage threshold and (2) a tuning household total count satisfies a tuning household total count threshold for selected recipient data. The localized event engine uses a localized event recipient data identifier to determine that the selected recipient data is exhibiting localized event media consumption behavior when a difference between a comparable media tuning percentage and a comparable media viewing percentage satisfies a threshold. The localized event engine makes an adjustment for the localized event media consumption behavior in the selected recipient data by using a localized event donor data identifier to identify donor data experiencing similar localized event media consumption behavior. The localized event engine uses a probability engine to calculate probabilities for the selected recipient data and the identified donor data. The localized event engine uses a MLV engine to impute the localized event media consumption behavior of viewing panelists associated with the identified donor data for the localized event media consumption behavior of tuning panelists associated with the selected recipient data to reduce imputation errors and to improve the accuracy of the demographic composition of exposed media.

It is noted that this patent claims priority from India Patent Application No. 201611019573, which was filed on Jun. 7, 2016, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform viewership assignment, the apparatus comprising:
   a localized event engine implemented with hardware or at least one processor to:
      in response to a difference satisfying a first threshold, determine that a first subset of tuning data associated with first panelist households having tuned to first media in a first area exhibits local bias, the difference to be between (i) a first percentage of exposure minutes determined from a second subset of the tuning data associated with exposure of the first panelist households to second media in the first area, the second media different from the first media, and (ii) a second percentage of exposure minutes determined from a first subset of viewing data associated with exposure of second panelist households to the second media in a second area, the second media related to the first media;
      determine that a second subset of the viewing data associated with the second panelist households having viewed the first media in the second area represents heavy viewing in response to (1) a first number of households represented in the second subset of the viewing data satisfying a second threshold and (2) a third percentage of exposure minutes determined from the second subset of the viewing data satisfying a third threshold; and
   a localized event selector implemented with hardware or the at least one processor to impute the second subset of the viewing data for the first subset of the tuning data when the second subset of the viewing data represents heavy viewing.

2. The apparatus of claim 1, wherein the localized event engine is to obtain the tuning data from media meters that are unable to identify respective ones of first panelists of the first panelist households, and the localized event engine is to obtain the viewing data from people meters that are able to identify respective ones of second panelists of the second panelist households.

3. The apparatus of claim 1, wherein the localized event engine is to:
   determine a second number of households tuned to the first media in the first area;
   determine a fourth percentage of exposure minutes tuned to the first media in the first area, the fourth percentage being a total of number of exposure minutes tuned to the first media with respect to a plurality of exposure minutes tuned to a plurality of media in the first area;
   determine that the second number of households satisfies a household number threshold;
   determine that the fourth percentage of exposure minutes satisfies an exposure percentage threshold; and
   determine that the first subset of the tuning data is heavy tuning data based on the household number threshold and the exposure percentage threshold being satisfied.

4. The apparatus of claim 1, wherein the viewing data is first viewing data and the second subset of the first viewing data is first heavy viewing data, and the localized event engine is to identify a first subset of second viewing data as second heavy viewing data in response to (1) a second number of households viewing the first media in the first area satisfying a household number threshold and (2) a fourth percentage of exposure minutes viewing the first media in the first area satisfying an exposure percentage threshold; and
   the localized event selector is to impute the second heavy viewing data for the first subset of the tuning data when the first subset of the second viewing data is identified as the second heavy viewing data.

5. The apparatus of claim 4, wherein the localized event selector is to impute at least one of the second subset of the first viewing data or the second subset of the second viewing data for the first subset of the tuning data when the second subset of the first viewing data is identified as the first heavy viewing data and the second subset of the second viewing data is identified as the second heavy viewing data.

6. The apparatus of claim 1, wherein the viewing data is first viewing data and the second subset of the first viewing data is first heaving viewing data, and the localized event engine is to identify a first subset of second viewing data as second heavy viewing data when (1) a second number of households viewing the first media in a third area satisfies a household number threshold and (2) a fourth percentage of exposure minutes viewing the first media in the third area satisfies an exposure percentage threshold; and
   the localized event selector is to impute the second heavy viewing data for the first subset of the tuning data when the first subset of the second viewing data is identified as the second heavy viewing data.

7. The apparatus of claim 1, wherein the first subset of the tuning data is heavy tuning data, the second subset of the viewing data is heavy viewing data, and further including:
   a localized event probability calculator implemented with hardware or the at least one processor to:
      calculate first probability values associated with a subset of the first panelist households associated with the heavy tuning data, the first probability values indicative of a likelihood that the subset of the first panelist households include first panelists that are likely viewers of the first media;

calculate second probability values associated with a subset of the second panelist households associated with the heavy viewing data, the second probability values indicative of a likelihood that the subset of the second panelist households include second panelists that are likely viewers of the first media; and the localized event selector is to associate a respective one of the subset of the first panelists with a respective one of the subset of the second panelists based on the first probability values and the second probability values.

8. A non-transitory computer readable storage medium comprising instructions that, when executed, cause a machine to at least:

in response to a difference satisfying a first threshold, determine that a first subset of tuning data associated with first panelist households having tuned to first media in a first area exhibits local bias, the difference to be between (i) a first percentage of exposure minutes determined from a second subset of the tuning data associated with exposure of the first panelist households to second media in the first area, the second media different from the first media, and (ii) a second percentage of exposure minutes determined from a first subset of viewing data associated with exposure of second panelist households to the second media in a second area, the second media related to the first media;

determine that a second subset of the viewing data associated with the second panelist households having viewed the first media in the second area represents heavy viewing in response to (1) a first number of households represented in the second subset of the viewing data satisfying a second threshold and (2) a third percentage of exposure minutes determined from the second subset of the viewing data satisfying a third threshold; and impute the second subset of the viewing data for the first subset of the tuning data when the second subset of the viewing data represents heavy viewing.

9. The non-transitory computer readable storage medium comprising of claim 8, wherein the instructions, when executed, cause the machine to obtain the tuning data from media meters that are unable to identify respective ones of first panelists of the first panelist households, and obtain the viewing data from people meters that are able to identify respective ones of second panelists of the second panelist households.

10. The non-transitory computer readable storage medium comprising of claim 8, wherein the instructions, when executed, cause the machine to:

determine a second number of households tuned to the first media in the first area;

determine a fourth percentage of exposure minutes tuned to the first media in the first area, the fourth percentage being a total of number of exposure minutes tuned to the first media with respect to a plurality of exposure minutes tuned to a plurality of media in the first area;

determine that the second number of households satisfies a household number threshold;

determine that the fourth percentage of exposure minutes satisfies an exposure percentage threshold; and determine that the first subset of the tuning data is heavy tuning data based on the household number threshold and the exposure percentage threshold being satisfied.

11. The non-transitory computer readable storage medium comprising of claim 8, wherein the viewing data is first viewing data and the second subset of the first viewing data is first heavy viewing data, and instructions, when executed, cause the machine to:

identify a first subset of second viewing data as second heavy viewing data in response to (1) a second number of households viewing the first media in the first area satisfying a household number threshold and (2) a fourth percentage of exposure minutes viewing the first media in the first area satisfying an exposure percentage threshold; and impute the second heavy viewing data for the first subset of the tuning data when the first subset of the second viewing data is identified as the second heavy viewing data.

12. The non-transitory computer readable storage medium comprising of claim 11, wherein the instructions, when executed, cause the machine to impute at least one of the second subset of the first viewing data or the second subset of the second viewing data for the first subset of the tuning data when the second subset of the first viewing data is identified as the first heavy viewing data and the second subset of the second viewing data is identified as the second heavy viewing data.

13. The non-transitory computer readable storage medium comprising of claim 8, wherein the viewing data is first viewing data and the second subset of the first viewing data is first heaving viewing data, and the instructions, when executed, cause the machine to:

identify a first subset of second viewing data as second heavy viewing data when (1) a second number of households viewing the first media in a third area satisfies a household number threshold and (2) a fourth percentage of exposure minutes viewing the first media in the third area satisfies an exposure percentage threshold; and impute the second heavy viewing data for the first subset of the tuning data when the first subset of the second viewing data is identified as the second heavy viewing data.

14. The non-transitory computer readable storage medium comprising of claim 8, wherein the first subset of the tuning data is heavy tuning data, the second subset of the viewing data is heavy viewing data, and the instructions, when executed, cause the machine to:

calculate first probability values associated with a subset of the first panelist households associated with the heavy tuning data, the first probability values indicative of a likelihood that the subset of the first panelist households include first panelists that are likely viewers of the first media;

calculate second probability values associated with a subset of the second panelist households associated with the heavy viewing data, the second probability values indicative of a likelihood that the subset of the second panelist households include second panelists that are likely viewers of the first media; and associate a respective one of the subset of the first panelists with a respective one of the subset of the second panelists based on the first probability values and the second probability values.

15. A method to perform viewership assignment, the method comprising:

in response to a difference satisfying a first threshold, determining, by executing an instruction with a processor, that a first subset of tuning data associated with first panelist households having tuned to first media in a first area exhibits local bias, the difference being between (i) a first percentage of exposure minutes determined from a second subset of the tuning data associated with exposure of the first panelist households to second media in the first area, the second media different from the first media, and (ii) a second percentage of exposure minutes determined from a first subset of viewing data associated with exposure of second panelist households to the second media in a second area, the second media related to the first media;

determining, by executing an instruction with the processor, that a second subset of the viewing data associated with the second panelist households having viewed the first media in the second area represents heavy viewing in response to (1) a first number of households represented in the second subset of the viewing data satisfying a second threshold and (2) a third percentage of exposure minutes determined from the second subset of the viewing data satisfying a third threshold; and imputing, by executing an instruction with the processor, the second subset of the viewing data for the first subset of the tuning data when the second subset of the viewing data represents heavy viewing.

16. The method of claim 15, further including obtaining the tuning data from media meters that are unable to identify respective ones of first panelists of the first panelist households, and obtaining the viewing data from people meters that are able to identify respective ones of second panelists of the second panelist households.

17. The method of claim 15, further including:
determining a second number of households tuned to the first media in the first area;
determining a fourth percentage of exposure minutes tuned to the first media in the first area, the fourth percentage being a total of number of exposure minutes tuned to the first media with respect to a plurality of exposure minutes tuned to a plurality of media in the first area;
determining that the second number of households satisfies a household number threshold;
determining that the fourth percentage of exposure minutes satisfies an exposure percentage threshold; and
determining that the first subset of the tuning data is heavy tuning data based on the household number threshold and the exposure percentage threshold being satisfied.

18. The method of claim 15, wherein the viewing data is first viewing data and the second subset of the first viewing data is first heavy viewing data, and further including:
identifying a first subset of second viewing data as second heavy viewing data in response to (1) a second number of households viewing the first media in the first area satisfying a household number threshold and (2) a fourth percentage of exposure minutes viewing the first media in the first area satisfying an exposure percentage threshold; and
imputing the second heavy viewing data for the first subset of the tuning data when the first subset of the second viewing data is identified as the second heavy viewing data.

19. The method of claim 18, further including imputing at least one of the second subset of the first viewing data or the second subset of the second viewing data for the first subset of the tuning data when the second subset of the first viewing data is identified as the first heavy viewing data and the second subset of the second viewing data is identified as the second heavy viewing data.

20. The method of claim 15, wherein the viewing data is first viewing data and the second subset of the first viewing data is first heaving viewing data, and further including:
identifying a first subset of second viewing data as second heavy viewing data when (1) a second number of households viewing the first media in a third area satisfies a household number threshold and (2) a fourth percentage of exposure minutes viewing the first media in the third area satisfies an exposure percentage threshold; and
imputing the second heavy viewing data for the first subset of the tuning data when the first subset of the second viewing data is identified as the second heavy viewing data.

21. The method of claim 15, wherein the first subset of the tuning data is heavy tuning data, the second subset of the viewing data is heavy viewing data, and further including:
calculating first probability values associated with a subset of the first panelist households associated with the heavy tuning data, the first probability values indicative of a likelihood that the subset of the first panelist households include first panelists that are likely viewers of the first media;
calculating second probability values associated with a subset of the second panelist households associated with the heavy viewing data, the second probability values indicative of a likelihood that the subset of the second panelist households include second panelists that are likely viewers of the first media; and
associating a respective one of the subset of the first panelists with a respective one of the subset of the second panelists based on the first probability values and the second probability values.

* * * * *